(12) United States Patent
Pellegrino et al.

(10) Patent No.: US 11,772,826 B2
(45) Date of Patent: Oct. 3, 2023

(54) ACTIVELY CONTROLLED SPACECRAFT DEPLOYMENT MECHANISM

(71) Applicant: California Institute of Technology, Pasadena, CA (US)

(72) Inventors: Sergio Pellegrino, Pasadena, CA (US); Eleftherios E. Gdoutos, Pasadena, CA (US); Antonio Pedivellano, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 788 days.

(21) Appl. No.: 16/670,941

(22) Filed: Oct. 31, 2019

(65) Prior Publication Data

US 2020/0130868 A1 Apr. 30, 2020

Related U.S. Application Data

(60) Provisional application No. 62/753,373, filed on Oct. 31, 2018.

(51) Int. Cl.
*B64G 1/22* (2006.01)

(52) U.S. Cl.
CPC ................... *B64G 1/222* (2013.01)

(58) Field of Classification Search
CPC ........ B64G 1/222; B64G 1/641; B64G 1/007; B64G 1/645; B64G 2001/643; B64G 1/005; B64G 1/1085; B64G 1/44; B65H 18/10; B65H 18/026; B65H 54/585; E02B 15/0842; E04C 3/005

See application file for complete search history.

(56) References Cited

U.S. PATENT DOCUMENTS

| | | | |
|---|---|---|---|
| 2,599,944 A | 6/1952 | Salisbury et al. |
| 3,152,260 A | 10/1964 | Cummings |
| 3,419,433 A | 12/1968 | Slifer, Jr. |
| 3,427,200 A | 2/1969 | Lapin et al. |
| 3,433,677 A | 3/1969 | Robinson et al. |
| 3,437,527 A | 4/1969 | Webb |

(Continued)

FOREIGN PATENT DOCUMENTS

| | | |
|---|---|---|
| CA | 2833826 A1 | 11/2012 |
| CA | 2833862 A1 | 5/2014 |

(Continued)

OTHER PUBLICATIONS

Geisz et al., "Infrared Reflective and Transparent Inverted Metamorphic Triple Junction Solar Cells", AIP Conference Proceedings, vol. 1277, Issue 11, pp. 11-15, Oct. 14, 2010.

(Continued)

*Primary Examiner* — Medhat Badawi
*Assistant Examiner* — Vicente Rodriguez

(57) ABSTRACT

An actively controlled deployment mechanism with a plurality of centrally controlled rollers as well as outer rollers that are configured to apply a pressure across the compactable portion of the deployable structure. The active control can be implemented though control motors and control loops programed to control the rotation of the rollers. Additionally, the actively controlled deployment reduces the need for bulky and heavy booms with high tension guide wires for the deployment of the structure.

22 Claims, 25 Drawing Sheets

(56) References Cited

U.S. PATENT DOCUMENTS

| | | |
|---|---|---|
| 3,457,427 A | 7/1969 | Tarneja et al. |
| 3,489,915 A | 1/1970 | Engelhardt et al. |
| 3,530,009 A | 9/1970 | Linkous et al. |
| 3,532,299 A | 10/1970 | Williamson et al. |
| 3,562,020 A | 2/1971 | Blevins |
| 3,611,652 A | 10/1971 | Rabenhorst et al. |
| 3,616,528 A | 11/1971 | Goldsmith et al. |
| 3,627,585 A | 12/1971 | Dollery et al. |
| 3,636,539 A | 1/1972 | Gaddy |
| 3,698,958 A | 10/1972 | Williamson et al. |
| 3,730,457 A | 5/1973 | Williams et al. |
| 3,735,943 A | 5/1973 | Fayet et al. |
| 3,758,051 A | 9/1973 | Williams |
| 3,781,647 A | 12/1973 | Glaser |
| 3,785,590 A | 1/1974 | Wentworth |
| 3,793,082 A | 2/1974 | Roger |
| 3,805,622 A | 4/1974 | Kinard |
| 3,809,337 A | 5/1974 | Andrews et al. |
| 3,817,477 A | 6/1974 | Luther et al. |
| 3,848,821 A | 11/1974 | Scheel |
| 3,863,870 A | 2/1975 | Andrews et al. |
| 3,952,324 A | 4/1976 | Wolff et al. |
| 3,989,994 A | 11/1976 | Brown |
| 4,078,747 A | 3/1978 | Minovitch |
| 4,116,258 A | 9/1978 | Slysh et al. |
| 4,133,501 A | 1/1979 | Pentlicki |
| 4,151,872 A | 5/1979 | Slysh et al. |
| 4,153,474 A | 5/1979 | Rex |
| 4,155,524 A | 5/1979 | Marello et al. |
| 4,234,856 A | 11/1980 | Jung et al. |
| 4,282,394 A | 8/1981 | Lackey et al. |
| 4,328,389 A | 5/1982 | Stern et al. |
| 4,415,759 A | 11/1983 | Copeland et al. |
| 4,416,052 A | 11/1983 | Stern |
| 4,419,532 A | 12/1983 | Severns |
| 4,687,880 A | 8/1987 | Morris |
| 4,735,488 A | 4/1988 | Rancourt et al. |
| 4,780,726 A | 10/1988 | Archer et al. |
| 4,784,700 A | 11/1988 | Stern et al. |
| 4,789,989 A | 12/1988 | Stern et al. |
| 4,947,825 A | 8/1990 | Moriarty |
| 4,953,190 A | 8/1990 | Kukoleck et al. |
| 5,013,128 A | 5/1991 | Stern et al. |
| 5,114,101 A | 5/1992 | Stern et al. |
| 5,131,955 A | 7/1992 | Stern et al. |
| 5,154,777 A | 10/1992 | Blackmon et al. |
| 5,177,396 A | 1/1993 | Gielen et al. |
| 5,180,441 A | 1/1993 | Cornwall et al. |
| 5,226,107 A | 7/1993 | Stern et al. |
| 5,280,441 A | 1/1994 | Wada et al. |
| 5,309,925 A | 5/1994 | Policastro |
| 5,310,141 A | 5/1994 | Homer et al. |
| 5,337,980 A | 8/1994 | Homer et al. |
| 5,344,496 A | 9/1994 | Stern et al. |
| 5,404,868 A | 4/1995 | Sankrithi |
| 5,428,483 A | 6/1995 | Sato et al. |
| 5,487,791 A | 1/1996 | Everman et al. |
| 5,496,414 A | 3/1996 | Harvey et al. |
| 5,512,913 A | 4/1996 | Staney |
| 5,520,747 A | 5/1996 | Marks |
| 5,569,332 A | 10/1996 | Glatfelter et al. |
| 5,623,119 A | 4/1997 | Yater et al. |
| 5,653,222 A | 8/1997 | Newman |
| 5,785,280 A | 7/1998 | Baghdasarian |
| 5,885,367 A | 3/1999 | Brown et al. |
| 5,909,299 A | 6/1999 | Sheldon, Jr. et al. |
| 5,909,860 A | 6/1999 | Lee et al. |
| 5,969,695 A | 10/1999 | Bassily et al. |
| 5,984,484 A | 11/1999 | Kruer |
| 6,017,002 A | 1/2000 | Burke et al. |
| 6,031,178 A | 2/2000 | Kester |
| 6,043,425 A | 3/2000 | Assad |
| 6,050,526 A | 4/2000 | Stribling |
| 6,060,790 A | 5/2000 | Craig, Jr. |
| 6,091,017 A | 7/2000 | Stern |
| 6,118,067 A | 9/2000 | Lashley et al. |
| 6,150,995 A | 11/2000 | Gilger |
| 6,188,012 B1 | 2/2001 | Ralph |
| 6,194,790 B1 | 2/2001 | Griffin et al. |
| 6,195,067 B1 | 2/2001 | Gilger |
| 6,284,967 B1 | 9/2001 | Hakan et al. |
| 6,300,558 B1 | 10/2001 | Takamoto et al. |
| 6,343,442 B1 | 2/2002 | Marks |
| 6,366,255 B1 | 4/2002 | Chiang |
| 6,366,256 B1 | 4/2002 | Ramanujam et al. |
| 6,369,545 B1 | 4/2002 | Williams et al. |
| 6,394,395 B1 | 5/2002 | Poturalski et al. |
| 6,423,895 B1 | 7/2002 | Murphy |
| 6,429,368 B1 | 8/2002 | Summers |
| 6,528,716 B2 | 3/2003 | Collette et al. |
| 6,534,705 B2 | 3/2003 | Berrios et al. |
| 6,541,916 B2 | 4/2003 | Decker |
| 6,547,190 B1 | 4/2003 | Thompson et al. |
| 6,555,740 B2 | 4/2003 | Roth et al. |
| 6,557,804 B1 | 5/2003 | Carroll |
| 6,560,942 B2 | 5/2003 | Warren et al. |
| 6,565,044 B1 | 5/2003 | Johnson et al. |
| 6,577,130 B1 | 6/2003 | Adamo et al. |
| 6,587,263 B1 | 7/2003 | Iacovangelo et al. |
| 6,590,150 B1 | 7/2003 | Kiefer |
| 6,635,507 B1 | 10/2003 | Boutros et al. |
| 6,655,638 B2 | 12/2003 | Deel |
| 6,660,927 B2 | 12/2003 | Zwanenburg |
| 6,660,928 B1 | 12/2003 | Patton et al. |
| 6,689,952 B2 | 2/2004 | Kawaguchi |
| 6,690,252 B2 | 2/2004 | Scoltock Jr. et al. |
| 6,713,670 B2 | 3/2004 | Stern et al. |
| 6,735,838 B1 | 5/2004 | Triller et al. |
| 6,735,920 B1 | 5/2004 | Cadogan |
| 6,768,048 B2 | 7/2004 | Woll et al. |
| 6,784,359 B2 | 8/2004 | Clark et al. |
| 6,799,742 B2 | 10/2004 | Nakamura et al. |
| 6,882,072 B2 | 4/2005 | Wingett et al. |
| 6,897,730 B2 | 5/2005 | Dupuis et al. |
| 6,903,261 B2 | 6/2005 | Habraken et al. |
| 6,904,749 B2 | 6/2005 | Joshi et al. |
| 6,909,042 B2 | 6/2005 | Geyer et al. |
| 6,936,760 B2 | 8/2005 | Spirnak et al. |
| 6,983,914 B2 | 1/2006 | Stribling et al. |
| 7,006,039 B2 | 2/2006 | Miyamoto et al. |
| 7,053,294 B2 | 5/2006 | Tuttle et al. |
| 7,077,361 B1 | 7/2006 | Rabinowitz |
| 7,138,960 B2 | 11/2006 | Carroll et al. |
| 7,163,179 B1 | 1/2007 | Taylor |
| 7,211,722 B1 | 5/2007 | Murphy |
| 7,271,333 B2 | 9/2007 | Fabick et al. |
| 7,301,095 B2 | 11/2007 | Murphy et al. |
| 7,303,166 B2 | 12/2007 | Geery |
| 7,319,189 B2 | 1/2008 | Ruelle et al. |
| 7,354,033 B1 | 4/2008 | Murphey et al. |
| 7,392,011 B1 | 6/2008 | Jacomb-Hood |
| 7,464,895 B2 | 12/2008 | Palmer |
| 7,474,249 B1 | 1/2009 | Williams et al. |
| 7,486,431 B2 | 2/2009 | Rabinowitz |
| 7,564,149 B2 | 7/2009 | Siri et al. |
| 7,568,479 B2 | 8/2009 | Rabinowitz |
| 7,612,284 B2 | 11/2009 | Rogers et al. |
| 7,736,007 B2 | 6/2010 | Rabinowitz |
| 7,866,836 B2 | 1/2011 | Rabinowitz |
| 7,878,667 B2 | 2/2011 | Rabinowitz |
| 7,895,795 B1 | 3/2011 | Murphey et al. |
| 7,960,641 B2 | 6/2011 | Rabinowitz |
| 8,071,873 B2 | 12/2011 | Rabinowitz |
| 8,146,867 B2 | 4/2012 | Jordan et al. |
| 8,215,298 B2 | 7/2012 | Klotz |
| 8,308,111 B2 | 11/2012 | Lu et al. |
| 8,356,774 B1 * | 1/2013 | Banik ............... B64G 1/222 |
| | | 244/171.1 |
| 8,439,511 B2 | 5/2013 | Stern et al. |
| 8,616,502 B1 | 12/2013 | Stribling et al. |
| 8,636,253 B1 | 1/2014 | Spence et al. |
| 8,683,755 B1 | 4/2014 | Spence et al. |
| 8,872,018 B1 | 10/2014 | Breen et al. |
| 9,004,410 B1 | 4/2015 | Steele et al. |

(56) References Cited

U.S. PATENT DOCUMENTS

| | | |
|---|---|---|
| 9,079,673 B1 | 7/2015 | Steele et al. |
| 9,120,583 B1 | 9/2015 | Spence et al. |
| 9,156,568 B1 | 10/2015 | Spence et al. |
| 9,248,922 B1 | 2/2016 | Baghdasarian et al. |
| 9,276,148 B2 | 3/2016 | Jaffe et al. |
| 9,346,566 B2 | 5/2016 | Spence et al. |
| 9,444,394 B1 | 9/2016 | Thomas et al. |
| 9,709,349 B2 | 7/2017 | Raman et al. |
| 9,856,039 B2 * | 1/2018 | Abrams ............... B64G 1/443 |
| 10,071,823 B2 | 9/2018 | Turse et al. |
| 10,144,533 B2 | 12/2018 | Atwater et al. |
| 10,340,698 B2 | 7/2019 | Pellegrino et al. |
| 11,142,349 B2 * | 10/2021 | Barnes ............... B65H 75/425 |
| 2002/0007845 A1 | 1/2002 | Collette et al. |
| 2002/0029796 A1 | 3/2002 | Mikami et al. |
| 2002/0029797 A1 | 3/2002 | Mikami et al. |
| 2002/0032992 A1 | 3/2002 | Roth et al. |
| 2002/0116877 A1 * | 8/2002 | Breitbach ............... B64G 1/222 52/2.18 |
| 2002/0134423 A1 | 9/2002 | Eller et al. |
| 2003/0098057 A1 | 5/2003 | Mizuno et al. |
| 2003/0098058 A1 | 5/2003 | Takada et al. |
| 2003/0192586 A1 | 10/2003 | Takada et al. |
| 2003/0196298 A1 | 10/2003 | Hinkley et al. |
| 2004/0011395 A1 | 1/2004 | Nicoletti et al. |
| 2004/0140930 A1 | 7/2004 | Harles |
| 2004/0187912 A1 | 9/2004 | Takamoto et al. |
| 2004/0231718 A1 | 11/2004 | Umeno et al. |
| 2005/0046977 A1 | 3/2005 | Shifman |
| 2005/0178921 A1 | 8/2005 | Stribling et al. |
| 2005/0241691 A1 | 11/2005 | Wakefield |
| 2005/0257823 A1 | 11/2005 | Zwanenburg |
| 2006/0038083 A1 | 2/2006 | Criswell |
| 2006/0109053 A1 | 5/2006 | Kim et al. |
| 2006/0157103 A1 | 7/2006 | Sheats et al. |
| 2006/0186274 A1 | 8/2006 | Wang et al. |
| 2006/0207189 A1 * | 9/2006 | Pryor ............... B64G 1/222 52/2.11 |
| 2007/0029446 A1 | 2/2007 | Mosher et al. |
| 2007/0087704 A1 | 4/2007 | Gilberton |
| 2008/0000232 A1 | 1/2008 | Rogers et al. |
| 2008/0088409 A1 | 4/2008 | Okada |
| 2008/0149162 A1 | 6/2008 | Martinelli et al. |
| 2008/0173349 A1 | 7/2008 | Liu et al. |
| 2008/0185039 A1 | 8/2008 | Chan |
| 2008/0251113 A1 | 10/2008 | Horne et al. |
| 2008/0283109 A1 | 11/2008 | Mankins et al. |
| 2009/0126792 A1 | 5/2009 | Gruhlke et al. |
| 2009/0151769 A1 | 6/2009 | Corbin |
| 2009/0199893 A1 | 8/2009 | Bita et al. |
| 2009/0223554 A1 | 9/2009 | Sharps |
| 2009/0250094 A1 | 10/2009 | Robison et al. |
| 2009/0301544 A1 | 12/2009 | Minelli |
| 2010/0170560 A1 | 7/2010 | Sapienza et al. |
| 2010/0180946 A1 | 7/2010 | Gruhlke et al. |
| 2010/0224231 A1 | 9/2010 | Hoke |
| 2010/0263709 A1 | 10/2010 | Norman et al. |
| 2010/0269885 A1 | 10/2010 | Benitez et al. |
| 2010/0276547 A1 | 11/2010 | Rubenchik et al. |
| 2010/0289342 A1 | 11/2010 | Maness |
| 2010/0300507 A1 | 12/2010 | Heng et al. |
| 2010/0319774 A1 | 12/2010 | Schwartz |
| 2011/0041894 A1 | 2/2011 | Liao |
| 2011/0049992 A1 | 3/2011 | Sant'Anselmo et al. |
| 2011/0061718 A1 | 3/2011 | Fork et al. |
| 2011/0080135 A1 | 4/2011 | Bland |
| 2011/0100425 A1 | 5/2011 | Osamura et al. |
| 2011/0120524 A1 | 5/2011 | Wares et al. |
| 2011/0203574 A1 | 8/2011 | Harding |
| 2011/0210209 A1 | 9/2011 | Taylor et al. |
| 2011/0232718 A1 | 9/2011 | Nawab |
| 2011/0300664 A1 | 12/2011 | Chung et al. |
| 2011/0315192 A1 | 12/2011 | Swatek et al. |
| 2012/0019942 A1 | 1/2012 | Morgan et al. |
| 2012/0024362 A1 | 2/2012 | Gossman |
| 2012/0031393 A1 | 2/2012 | Linderman et al. |
| 2012/0125415 A1 | 5/2012 | Tischler |
| 2012/0138749 A1 | 6/2012 | Ellinghaus |
| 2012/0138997 A1 | 6/2012 | Tasaki et al. |
| 2012/0160299 A1 | 6/2012 | Reid et al. |
| 2012/0243252 A1 | 9/2012 | Kim |
| 2013/0009851 A1 | 1/2013 | Danesh |
| 2013/0032673 A1 | 2/2013 | Kobayashi |
| 2013/0093287 A1 | 4/2013 | Biso et al. |
| 2013/0099599 A1 | 4/2013 | Jaffe et al. |
| 2013/0133730 A1 | 5/2013 | Pan et al. |
| 2013/0220399 A1 | 8/2013 | Gruhlke et al. |
| 2013/0233974 A1 | 9/2013 | Maiboroda et al. |
| 2013/0319504 A1 | 12/2013 | Yang et al. |
| 2013/0319505 A1 | 12/2013 | Yang et al. |
| 2013/0332093 A1 | 12/2013 | Adest et al. |
| 2014/0041705 A1 | 2/2014 | Kang et al. |
| 2014/0083479 A1 | 3/2014 | Takayama et al. |
| 2014/0102686 A1 | 4/2014 | Yu et al. |
| 2014/0131023 A1 | 5/2014 | Raman et al. |
| 2014/0148197 A1 | 5/2014 | Shields |
| 2014/0158197 A1 | 6/2014 | Rubenstein et al. |
| 2014/0159636 A1 | 6/2014 | Yang et al. |
| 2014/0261621 A1 | 9/2014 | Gruhlke et al. |
| 2014/0261622 A1 | 9/2014 | Floyd et al. |
| 2014/0263844 A1 | 9/2014 | Cook, Jr. et al. |
| 2014/0263847 A1 | 9/2014 | Eskenazi et al. |
| 2014/0326833 A1 | 11/2014 | Spence et al. |
| 2014/0356613 A1 | 12/2014 | Weisenberger et al. |
| 2015/0022909 A1 | 1/2015 | O'Neill |
| 2015/0053253 A1 | 2/2015 | O'Neill |
| 2015/0130293 A1 | 5/2015 | Hajimiri et al. |
| 2015/0144740 A1 | 5/2015 | Turse et al. |
| 2015/0155413 A1 | 6/2015 | Pokharna et al. |
| 2015/0217876 A1 | 8/2015 | Halsband |
| 2016/0056321 A1 | 2/2016 | Atwater et al. |
| 2016/0065006 A1 | 3/2016 | Woods |
| 2016/0122041 A1 | 5/2016 | Abrams et al. |
| 2016/0164451 A1 | 6/2016 | Lenert et al. |
| 2016/0311558 A1 * | 10/2016 | Turse .................... B64G 1/222 |
| 2016/0376037 A1 | 12/2016 | Pellegrino et al. |
| 2016/0380486 A1 | 12/2016 | Hajimiri et al. |
| 2016/0380580 A1 | 12/2016 | Atwater et al. |
| 2017/0021947 A1 | 1/2017 | Pellegrino et al. |
| 2017/0025992 A1 | 1/2017 | Atwater et al. |
| 2017/0047463 A1 | 2/2017 | Hajimiri et al. |
| 2017/0047886 A1 | 2/2017 | Atwater et al. |
| 2017/0047889 A1 | 2/2017 | Atwater et al. |
| 2017/0047987 A1 | 2/2017 | Pellegrino et al. |
| 2017/0063296 A1 | 3/2017 | Cruijssen et al. |
| 2018/0313083 A1 | 11/2018 | Murphey |
| 2018/0315877 A1 | 11/2018 | Kelzenberg et al. |
| 2020/0024007 A1 | 1/2020 | Pellegrino et al. |
| 2020/0130872 A1 * | 4/2020 | Spencer ................ B64G 1/62 |

FOREIGN PATENT DOCUMENTS

| | | |
|---|---|---|
| CN | 104158471 A | 11/2014 |
| EP | 0541052 A1 | 5/1993 |
| EP | 0977273 A1 | 2/2000 |
| EP | 0996170 A2 | 4/2000 |
| EP | 1501132 A2 | 1/2005 |
| EP | 976655 B1 | 9/2005 |
| EP | 1852919 A2 | 11/2007 |
| EP | 1852919 A3 | 2/2009 |
| EP | 2318045 A1 | 5/2011 |
| EP | 3325347 A1 | 5/2018 |
| EP | 3334655 A1 | 6/2018 |
| FR | 2956774 A1 | 8/2011 |
| GB | 2247564 A | 3/1992 |
| JP | 6298781 A | 5/1987 |
| JP | S63254772 A | 10/1988 |
| JP | 0369258 U | 7/1991 |
| JP | H05107328 A | 4/1993 |
| JP | H06253477 A | 9/1994 |
| JP | 082500 A | 9/1996 |
| JP | 2000114571 A | 4/2000 |
| JP | 2001088799 A | 4/2001 |
| JP | 2001309581 A | 11/2001 |

(56) References Cited

FOREIGN PATENT DOCUMENTS

| | | | |
|---|---|---|---|
| JP | 2002362500 | A | 12/2002 |
| JP | 2003164077 | A | 6/2003 |
| JP | 2003164078 | A | 6/2003 |
| JP | 2003191899 | A | 7/2003 |
| JP | 2004090817 | A | 3/2004 |
| JP | 2004196051 | A | 7/2004 |
| JP | 2004253471 | A | 9/2004 |
| JP | 2004296658 | A | 10/2004 |
| JP | 2009184603 | A | 8/2009 |
| JP | 2010259301 | A | 11/2010 |
| WO | 2004049538 | A2 | 6/2004 |
| WO | 2008073905 | A2 | 6/2008 |
| WO | 2010033632 | A2 | 3/2010 |
| WO | 2011006506 | A1 | 1/2011 |
| WO | 2011062785 | A2 | 5/2011 |
| WO | 2011067772 | A1 | 6/2011 |
| WO | 2011109275 | A1 | 9/2011 |
| WO | 2011062785 | A3 | 11/2011 |
| WO | 2015175839 | | 11/2015 |
| WO | 2015179213 | A2 | 11/2015 |
| WO | 2015179214 | A2 | 11/2015 |
| WO | 2015187221 | A2 | 12/2015 |
| WO | 2015187739 | | 12/2015 |
| WO | 2017015508 | | 1/2017 |
| WO | 2017015605 | | 1/2017 |
| WO | 2017027615 | | 2/2017 |
| WO | 2017027617 | | 2/2017 |
| WO | 2017027629 | | 2/2017 |
| WO | 2017027633 | | 2/2017 |

OTHER PUBLICATIONS

Herbeck et al., "Development and test of deployable ultra-lightweight CFRP-booms for a Solar Sail", European Space Agency, (Special Publication) ESA SP, 49(468):107-112, 2001.

Hillebrandt et al., "The Boom Design of the De-Orbit Sail Satellite", European Conference on Spacecraft Structures, Materials and Mechanical Testing, European Conference on Spacecraft Structures, Materials & Environmental Testing, Apr. 1-4, 2014, Braunschweig, Germany, 8 pgs.

Huang et al., "Gate-tunable conducting oxide metasurfaces", Nano Letters, vol. 16, No. 9., web publication date Aug. 26, 2016, pp. 5319-5325.

Irwin et al., "Low-Mass Deployable Spacecraft Booms", AIAA Space 2010 Conference & Exposition, pp. 1-11, Aug. 30, 2010.

Jaffe et al., "Development of a Sandwich Module Prototype for Space Solar Power", 2012 IEEE Aerospace Conference, Mar. 3-10, 2012, Big Sky, MT, USA, pp. 1-9, DOI: 10.1109/AERO.2012. 6187077.

Jaffe et al., "Energy Conversion and Transmission Modules for Space Solar Power", Proceedings of the IEEE, Jun. 2013, vol. 101, No. 6, pp. 1424-1437, DOI: 10.1109/JPROC.2013.2252591.

Jang et al., "Tunable large resonant absorption in a midinfrared graphene Salisbury screen", Physical Review. B, Oct. 8, 2014, vol. 90, No. 16, pp. 165409-1-165409-5.

Johnson et al., "NanoSail-D: A Solar Sail Demonstration Mission", Acta Astronautica, 2011, Published Online Mar. 6, 2010, vol. 68, pp. 571-575, doi: 10.1016/j.actaastro.2010.02.008.

Kaltenbrunner et al., "Flexible high power-per-weight perovskite solar cells with chromium oxide-metal contacts for improved stability in air", Nature Materials, vol. 14, doi:10.1038/nmat4388, Aug. 24, 2015, pp. 1032-1039.

Kelly, "On Kirchhoff's law and its generalized application to absorption and emission by cavities", Journal of Research of the National Bureau of Standards-B. Mathematics and Mathematical Physics, Jul.-Sep. 1965, vol. 69B, No. 3, pp. 165-171.

Kildishev et al., "Planar Photonics with Metasurfaces", Science, Mar. 15, 2013, vol. 339, No. 6125, p. 1232009-1-1232009-6.

Knott et al., "Performance Degradation of Jaumann Absorbers Due to Curvature", IEEE Transactions on Antennas and Propagation, Jan. 1980, vol. AP28, No. 1, pp. 137-139.

Kryder et al., "Heat Assisted Magnetic Recording", Proceeding of the IEEE, current version published Dec. 2, 2008, vol. 96, No. 11, pp. 1810-1835.

Lacoe, R. C. "Improving Integrated Circuit Performance Through the Application of Hardness-by-Design Methodology", IEEE Transactions on Nuclear Science, vol. 55, issue: 4, Aug. 2008, pp. 1903-1925.

Lamoureux et al., "Dynamic kirigami structures for integrated solar tracking", Nature Communications, DOI:10.1038/ncomms9092, Sep. 8, 2015, pp. 1-6.

Leclerc et al., "Characterization of Ultra-Thin Composite Triangular Rollable and Collapsible Booms", 4th AIAA Spacecraft Structures Conference, AIAA SciTech Forum, Jan. 2017, 15 pgs.

Leclerc et al., "Stress Concentration and Material Failure During Coiling of Ultra-Thin TRAC Booms", 2018 AIAA Spacecraft Structures Conference, Jan. 7, 2018, p. 0690, 16 pgs., doi: 10.2514/6.2018-0690.

Lee et al., "Non-Destructive Wafer Recycling for Low-Cost Thin-Film Flexible Optoelectronics", Advanced Functional Materials, Apr. 2, 2014, vol. 24, pp. 4284-4291.

Liang et al., "Additive Enhanced Crystallization of Solution-Processed Perovskite for Highly Efficient Planar-Heterojunction Solar Cells", Advanced Materials, Mar. 14, 2014, vol. 26, pp. 3748-3754.

Liu et al., "Microstructure, thermal shock resistance and thermal emissivity of plasma sprayed LaMAl11 O19(M=Mg, Fe) coatings for metallic thermal protection systems", Applied Surface Science, vol. 271, Feb. 6, 2013, pp. 52-59.

Lohmeyer et al., "Correlation of GEO communication satellite anomalies and space weather phenomena: Improved satellite performance and risk mitigation", paper presented at 30th AIAA International Communications Satellite Systems Conference (ICSSC), Ottawa, Canada, pp. 1-20, Jul. 13, 2012.

Luukkonen et al., "A thin electromagnetic absorber for wide incidence angles and both polarizations", IEEE Transactions on Antennas and Propagation, IEEE Transactions on Antennas and Propagation Jul. 28, 2009, pp. 3119-3125.

Mankins, "A technical overview of the "SunTower" solar power satellite concept", Acta Astronautica, 50(6):369-377, Mar. 1, 2002.

Mankins, "SPS-Alpha: The First Practical Solar Power Satellite via Arbitrarily Large Phased Array (A 2011-2012 NASA NIAC Phase 1 Project)", Artemis Innovation Management Solutions LLC, Sep. 15, 2012, NIAC Phase 1 Final Report, 113 pgs.

McNutt et al., "Near-Earth Asteroid Scout", American Institute of Aeronautics and Astronautics, AIAA Space 2014 Conference and Exposition, Aug. 4-7, 2014, San Diego, CA, 9 pgs., doi: 10.2514/6.2014-4435.

Messenger et al., "Quantifying low energy proton damage in multijunction solar cell", in the proceedings of the 19th Space photovoltaic research and technology conference, 2005, NASA/CP-2007-214494, pp. 8-17.

Messenger et al., "Status of Implementation of Displacement Damage Dose Method for Space Solar Cell Degradation Analyses", 2008 Dd EOL Calc via SPENVIS manuscript SRM2, Jan. 2008, 8 pgs., Jan. 2008.

Miyazawa et al., "Evaluation of radiation tolerance of perovskite solar cell for use in space", Photovoltaic Specialist Conference (PVSC), 2015 IEEE 42nd, New Orleans, LA, USA, Dec. 17, 2015, pp. 1-4, published Jun. 1, 2015.

Mizuno et al., "A black body absorber from vertically aligned single-walled carbon nanotubes", Proc. Natl. Acad. Sci., Apr. 14, 2009, vol. 106, No. 15, pp. 6044-6047.

Murphey et al., "TRAC Boom Structural Mechanics", American Institute of Aeronautics and Astronautics, Jan. 9-13, 2017, Grapevine, TX, 4th AIAA Spacecraft Structures Conference, 13 pgs., doi: 10.2514/6.2017-0171.

Narimanov et al., "Reduced reflection from roughened hyperbolic metamaterial", Optics Express, Jun. 17, 2013, vol. 21, No. 12, pp. 14956-14961.

Narita et al., "Development of high accuracy phase control method for space solar power system", Proc. IEEE International Microwave

(56) References Cited

OTHER PUBLICATIONS

Workshop Series on Innovative Wireless Power Transmission: Technologies, Systems, and Applications, May 12-13, 2011, p. 227-230.
NASA TV, "Solar Power, Origami-Style", printed Aug. 14, 2014 from http://www.nasa.gov/jpl/news/origami-style-power-20140814, 4 pgs.
Ni et al., "Metasurface holograms for visible light", Nature Communications, Nov. 15, 2013, vol. 4, pp. 1-6.
Nishioka et al., "Evaluation of temperature characteristics of high-efficiency InGaP/InGaAs/Ge triple-junction solar cells under concentration", Solar Energy Materials and Solar Cells, vol. 85, Issue 3, Jan. 31, 2005, pp. 429-436.
NTPT, "NTPT Thin prepreg 402", Data sheet, Version 1.6, May 11, 2017, 5 pgs.
O'Hara, "Mechanical properties of silicone rubber in a closed volume", Technical Report, Army Armament Research and Development Center, Dec. 1983, 21 pgs.
O'Brien et al., "The AE9/AP9 Radiation Specification Development", Aerospace Corporation, Sep. 15, 2009, Report No. TOR-2009(3905)-8, 29 pgs.
Pellegrino, "AAReST telescope architecture", obtained from http://www.pellegrino.caltech.edu/aarest2/, printed Jul. 5, 2017, 4 pgs.
Penjuri et al., "Simulation and Testing of Deployable CFRP Booms for Large Space Structures", PhD thesis, Aug. 2011, 118 pgs.
Petrovic et al., "Design Methodology for Fault Tolerant ASICs", IEEE 15th International Symposium, Design and Diagnostics of Electronic Circuits & Systems (DDECS), Apr. 18-20, 2012, pp. 8-12.
Pors et al., "Analog Computing Using Reflective Plasmonic Metasurfaces", Nano Lett., Dec. 18, 2014, vol. 15, pp. 791-797.
Preston et al., "From plasmon spectra of metallic to vibron spectra of dielectric nanoparticles", Accounts of Chemical Research, Jan. 9, 2012, vol. 45, No. 9, pp. 1501-1510.
Radford et al., "Measurement of Manufacturing Distortion in Flat Composite Laminates", International Conference on Composite Materials, Jul. 1999, 9 pgs.
Radford et al., "Separating Sources of Manufacturing Distortion in Laminated Composites", Journal of Reinforced Plastics and Composites, first published May 1, 2000, vol. 19, No. 08/2000, pp. 621-641.
Rakic et al., "Algorithm for the determination of intrinsic optical constants of metal films: application to aluminum", Applied Optics, Aug. 1, 1995, vol. 34, No. 22, pp. 4755-4767.
Rakic et al., "Optical Properties of Metallic Films for Vertical-Cavity Optoelectronic Devices", Applied Optics, Aug. 1, 1998, vol. 37, No. 22, pp. 5271-5283.
ATI Industrial, Multi-Axis Force / Torque Sensor, ATI Industrial Automation, Jul. 23, 2014, pp. 1-44.
DuPont Kapton, Mar. 2012, 26 pgs.
Extended European Search Report for European Application No. 15795587.3, Search completed Feb. 5, 2018, dated Feb. 12, 2018, 7 Pgs.
Extended European Search Report for European Application No. 15803447.0, Search completed Oct. 17, 2017, dated Oct. 25, 2017, 10 Pgs.
Extended European Search Report for European Application No. 16828571.6, Search completed Mar. 18, 2019, dated Mar. 22, 2019, 17 Pgs.
Extended European Search Report for European Application No. 16835856.2, Search completed Feb. 22, 2019 dated Mar. 1, 2019, 8 Pgs.
International Preliminary Report on Patentability for International Application PCT/US2015/030895, dated Nov. 15, 2016, dated Nov. 24, 2016, 12 Pgs.
International Preliminary Report on Patentability for International Application PCT/US2015/030900, dated Nov. 15, 2016, dated Nov. 24, 2016, 9 Pgs.
International Preliminary Report on Patentability for International Application PCT/US2015/030909, dated Nov. 15, 2016, dated Nov. 24, 2016, 11 Pgs.
International Preliminary Report on Patentability for International Application PCT/US2015/033841, dated Dec. 6, 2016, dated Dec. 15, 2016, 8 Pgs.
International Preliminary Report on Patentability for International Application PCT/US2016/043424, dated May 15, 2018, dated May 24, 2018, 12 Pgs.
International Preliminary Report on Patentability for International Application PCT/US2016/043677, dated Jan. 23, 2018, dated Feb. 1, 2018, 6 pgs.
International Preliminary Report on Patentability for International Application PCT/US2016/046389, dated Feb. 13, 2018, dated Feb. 22, 2018, 9 pgs.
International Preliminary Report on Patentability for International Application PCT/US2016/046394, Report dated Feb. 13, 2018, dated Feb. 22, 2018, 10 Pgs.
International Preliminary Report on Patentability for International Application PCT/US2016/046415, Report dated Feb. 13, 2018, dated Feb. 22, 2018, 8 Pgs.
International Preliminary Report on Patentability for International Application PCT/US2016/046421, Report dated Feb. 13, 2018, dated Feb. 22, 2018, 8 Pgs.
International Search Report and Written Opinion for International Application No. PCT/US2015/030895, completed Nov. 27, 2015, dated Nov. 30, 2015, 14 Pgs.
International Search Report and Written Opinion for International Application No. PCT/US2015/030909, completed Nov. 27, 2015, dated Nov. 27, 2015, 13 Pgs.
International Search Report and Written Opinion for International Application No. PCT/US2016/043424, completed Nov. 15, 2016, dated Nov. 15, 2016, 14 Pgs.
International Search Report and Written Opinion for International Application No. PCT/US2016/043677, completed Oct. 21, 2016, dated Oct. 21, 2016, 8 Pgs.
International Search Report and Written Opinion for International Application No. PCT/US2016/046389, completed Nov. 22, 2016, dated Nov. 22, 2016, 11 Pgs.
International Search Report and Written Opinion for International Application No. PCT/US2016/046394, completed Nov. 17, 2016, dated Nov. 17, 2016, 12 Pgs.
International Search Report and Written Opinion for International Application No. PCT/US2016/046415, completed Nov. 17, 2016, dated Nov. 17, 2016, 10 Pgs.
International Search Report and Written Opinion for International Application No. PCT/US2016/046421, completed Nov. 17, 2016, dated Nov. 17, 2016, 10 Pgs.
International Search Report and Written Opinion for International Application PCT/US2015/030900, Completed Aug. 11, 2015, dated Aug. 13, 2015, 11 pgs.
International Search Report and Written Opinion for International Application PCT/US2015/033841, Completed Sep. 10, 2015, dated Sep. 11, 2015, 11 pgs.
Smooth on, Mold Max® XLS® II, Jan. 15, 2016, 2 pgs.
"AZ Technology | Materials, Paint and Coatings: AZ-93 White Thermal Control, Electrically Conductive Paint / Coating (AZ's Z-93P)", Available http://www.aztechnology.com/materials-coatings-az-93.html, Accessed: Dec. 19, 2016, 2 pgs.
"Corona Resistant Kapton CR Takes Electrical Insulation Design and Reliability to New Levels", Kapton, DuPont Films, H-54506-1.
"DuPont Kapton 100CRC: Technical Data Sheet", kapton.dupont.com, Jul. 2014, K-28402.
"DuPont Kapton 120FWN616B", kapton.dupont.com, K-28459, Sep. 2014.
"DuPont Kapton 150FCRC019", kapton.dupont.com, K-28402, Jun. 2014.
"DuPont Kapton 150FWN019: Magnet Wire Insulation", www.kapton.dupont.com, H-78319-01, Mar. 2005.
"DuPont Kapton 150FWR019: Insulation Substrate", www.dupont.com/kapton, H-78312, Nov. 2001.
"DuPont Kapton 150PRN411", kapton.com, K-28731, Dec. 2014.

(56) References Cited

OTHER PUBLICATIONS

"DuPont Kapton 200FWR919: Insulation Substrate", www.dupont.com/kapton, H-78313, Nov. 2001.
"DuPont Kapton 200RS100", kapton.com, K-15354-2, Sep. 2014.
"DuPont Kapton B: Technical Bulletin", kapton.dupont.com, K-25099-1, Jul. 2013.
"DuPont Kapton FCR: Advanced Magnet Wire Insulation", Jun. 2005, H-99888.
"DuPont Kapton FN: Polyimide Film", kapton.com, K-15347-2, Jun. 2015.
"DuPont Kapton FPC: Polyimide Film", kapton.dupont.com, K-15361, Mar. 2006.
"DuPont Kapton GS Polyimide Film: Technical Data Sheet", kapton.dupont.com, K-26875-1, Jul. 2014.
"DuPont Kapton HN:Polyimide Film", kapton.dupont.com, K-15345-1, Apr. 2011.
"DuPont Kapton HPP-ST: Polyimide Film", kapton.dupont.com, K-15357, Mar. 2006.
Raman et al., "Passive radiative cooling below ambient air temperature under direct sunlight", Nature, Nov. 27, 2014, vol. 515, pp. 540-544.
Reha et al., "A Dual-Band Rectangular CPW Folded Slot Antenna for GNSS Applications", International Journal of Advanced Research in Electrical, Electronics and Instrumentation Engineering, Aug. 2014. pp. 11055-11061.
Rephaeli et al., "Absorber and emitter for solar thermo-photovoltaic systems to achieve efficiency exceeding the Shockley-Queisser limit", Optics. Express, Aug. 11, 2009, vol. 17, No. 17, pp. 15145-15159.
Rephaeli et al., "Ultrabroadband Photonic Structures To Achieve High-Performance Daytime Radiative Cooling", Nano Letters, vol. 13, Mar. 5, 2013, pp. 1457-1461.
Roybal et al., "Development of an Elastically Deployable Boom for Tensioned Planar Structures", American Institute of Aeronautics and Astronautics, Apr. 23-26, 2007, 48th AIAA/ASME/ASCE/AHS/ASC Structures, Structural Dynamics, and Materials Conference, 14 pgs., doi: 10.2514/6.2007-1838.
Rubenchik et al., "Solar Power Beaming: From Space to Earth", U.S. Department of Energy Office of Scientific and Technical Information, Apr. 14, 2009, Technical Report LLNL-TR-412782, 16 pgs. DOI: 10.2172/952766.
Santer et al., "Composite Tube Flexures at Nanosatellite Scale", 4th AIAA Space-craft Structures Conference, Jan. 9-13, 2017, 12 pgs.
Sasaki, "How Japan plans to build an orbital solar farm", printed from https://energy.gov/articles/space-based-solar-power, published Apr. 24, 2014.
Sasaki et al., "A new concept of solar power satellite: Tethered-SPS", Acta Astronautica, 2006, vol. 60, pp. 153-165, doi:10.1016/j.actaastro.2006.07.010.
Sato et al., "Modeling of degradation behavior of InGaP/GaAs/Ge triple-junction space solar cell exposed to charged particles", Journal of Applied Physics, vol. 105, 2009, pp. 044504-1-044504-6.
Scholl et al., "Quantum plasmon resonances of individual metallic nanoparticles", Nature, Mar. 22, 2012, vol. 483, doi: 10.1038/nature10904, pp. 421-428.
Seffen et al., "Deployment dynamics of tape springs", Proceedings of the Royal Society of London A: Mathematical, Physical and Engineering Sciences, Mar. 9, 1999, vol. 455, , pp. 1003-1048.
Shaltout et al., "Time-varying metasurfaces and Lorentz non-reciprocity", Optical Materials Express, Nov. 1, 2015, vol. 5, No. 11, pp. 2459-2467.
Shin-Etsu, "Meeting the increasingly diverse and sophisticated needs of industry with the unique properties of silicone rubbers", Characteristic properties of Silicone Rubber Compounds, 2013, 16 pgs.
Sickinger et al., "Lightweight deployable booms: Design, manufacture, verification, and smart materials application", 55th International Astronautical Congress, Vancouver, Canada, Oct. 4-8, 2004, pp. 1-11.
Sihn et al., "Experimental studies of thin-ply laminated composites", Composites Science and Technology, May 1, 2007, vol. 67, pp. 996-1008.
Silva et al., "Performing Mathematical Operations with Metamaterials", Science, Jan. 10, 2014, vol. 343, No. 6167, pp. 160-163.
Silverman et al., "Outdoor Performance of a Thin-Film Gallium-Arsenide Photovoltaic Module", presented at the 39th IEEE Photovoltaic Specialist Conference, Conference Jun. 16-21, 2013, Tampa, Florida, USA, 6 pgs.
Snoeys et al., "Integrated Circuits for Particle Physics Experiments", IEEE Journal Solid-State Circuits, vol. 35, issue 12, Dec. 2000, pp. 2018-2030.
Stabile et al., "Coiling dynamic analysis of thin-walled composite deployable boom", Composite Structures, Mar. 29, 2014, vol. 113, pp. 429-436.
Steeves, "Multilayer Active Shell Mirrors", Thesis of John Steeves, May 5, 2015, 164 pgs.
Stohlman et al., "Thermal Deformation of Very Slender Triangular Rollable and Collapsible Booms", 3rd AIAA Spacecraft Structures Conference, San Diego, California, 2016, pp. 2016-1469.
Streyer et al., "Strong absorption and selective emission from engineered metals with dielectric coatings", Optics Express , Apr. 8, 2013, vol. 21, No. 7, pp. 9113-9122.
Stuart et al., "Absorption enhancement in silicon-on-insulator waveguides using metal island films,", Appl. Phys. Lett., Oct. 14, 1996, vol. 69, No. 16, pp. 2327-2329.
Stuart et al., "Island size effects in nanoparticle-enhanced photodetectors", Appl. Phys. Lett., Dec. 28, 1998, vol. 73, No. 26, pp. 3815-3817.
Svanberg et al., "An experimental investigation on mechanisms for manufacturing induced shape distortions in homogeneous and balanced laminates", Composites—Part A: Applied Science and Manufacturing, Jun. 1, 2001, vol. 32, pp. 827-838.
Torayca, "T800H Technical Data Sheet", Technical report No. CFA-007, 2 pgs.
Tsai et al., "High-efficiency two-dimensional Ruddlesden-Popper perovskite solar cells", Nature, Aug. 18, 2016, vol. 536, doi: 10.1038/nature18306, 15 pgs.
Vaccaro et al., "In-flight experiment for combined planar antennas and solar cells (SOLANT)", IET Microwaves Antennas & Propaga, vol. 3, No. 8, Dec. 1, 2009 (Dec. 1, 2009), pp. 1279-1287.
Walker et al., "An investigation of tape spring fold curvature", Proceedings of the 6th International Conference on Dynamics and Control of Systems and Structures in Space, Citeseer, 2004, 10 pgs.
Walters et al., "Spenvis implementation of end-of-life solar cell calculations using the displacement damage dose methodology", in the Proceedings of the 19th Space Photovoltaic Research and Technology Conference, Feb. 1, 2007, 9 pgs.
Wang et al., "A Broadband Self-Healing Phase Synthesis Scheme", Radio Frequency Integrated Circuits Symposium (RFIC), IEEE, Jun. 5-7, 2011, 4 pgs.
Weinberg et al., "Radiation and temperature effects in gallium arsenide, indium phosphide, and silicon solar cells", NASA Technical Memorandum 89870, Washington, D.C., May 4-8, 1987, 14 pgs.
Wells et al., "Metamaterials-based Salisbury screens with reduced angular sensitivity", Appl. Phys. Lett., Oct. 21, 2014, vol. 105, pp. 161105-1-161105-4.
White et al., "Cure Cycle Optimization for the Reduction of Processing-Induced Residual Stresses in Composite Materials", Journal of Composite Materials, Dec. 1, 1993, vol. 27, No. 14, pp. 1352-1378.
Whorton et al., "Nanosail-D: the first flight demonstration of solar sails for nanosatellites", 22nd AIAA/USU Conference on Small Satellites, Aug. 11, 2008, pp. 1-6.
Wood, "Space-based solar power", printed Jul. 5, 2017 from https://energy.gov/articles/space-based-solar-power, Mar. 6, 2014, 7 pgs.
Wu et al., "Retarding the crystallization of Pbl2 for highly reproducible planar-structured perovskite solar cells via sequential deposition", Energy & Environmental Science 7, Jun. 24, 2014, pp. 2934-2938.
Yamaguchi, "Radiation-resistant solar cells for space use", Solar Energy Materials & Solar Cells, 2001. vol. 68, pp. 31-53.

(56) References Cited

OTHER PUBLICATIONS

Yamaguchi et al., "Correlations for damage in diffused-junction InP solar cells induced by electron and proton irradiation", Journal of Applied Physics, May 1, 1997, vol. 81, No. 9, 6013-6018.

Yamaguchi et al., "Mechanism for the anomalous degradation of Si solar cells induced by high fluence 1 MeV electron irradiation", Applied Physics Letters, May 27, 1996, vol. 68, No. 22, pp. 3141-3143.

Yu et al., "A Broadband, Background-Free Quarter-Wave Plate Based on Plasmonic Metasurfaces", Nano Letters, Nov. 3, 2012, vol. 12, No. 12, pp. 6328-6333.

Yu et al., "Flat optics with designer metasurfaces", Nature Materials, 2014, vol. 13, pp. 139-150.

Zhang et al., "Infrared Refractive Index and Extinction Coefficient of Polyimide Films", International Journal of Thermophysics, May 1, 1998, vol. 19, No. 3, pp. 905-916.

Zhang et al., "Intrinsic instability of the hybrid halide perovskite semiconductor CH3NH3PbI3", Chinese Physics Letters, Jun. 3, 2015, vol. 35, No. 3, 036104, 11 pgs.

Zheng et al., "Metasurface holograms reaching 80% efficiency", Nature Nanotechnology, published online Feb. 23, 2015, pp. 1-6.

Zhu et al., "Radiative cooling of solar cells", Optica, Jul. 22, 2014, vol. 1, pp. 32-38.

Zhu et al., "Radiative cooling of solar absorbers using a visibly transparent photonic crystal thermal blackbody", PNAS, Oct. 6, 2015, vol. 112, pp. 12282-12287.

"DuPont Kapton MT: Technical Data Sheet", kapton.dupont.com, H-38497-3, Apr. 2014.

"DuPont Kapton PST: Polyimide Film", kapton.dupont.com, K-10790, Nov. 2005.

"DuPont Kapton PV9100 Series: Polyimide Films", kapton.dupont.com, K-26028-1_A4, Oct. 2012.

"DuPont Kapton: Polyimide Film", kapton.dupont.com, Mar. 2012, H-38479-9, 7 pgs.

"ESA. Composite material structures.", printed Jun. 29, 2017 from http://www.esa.int/Our_Activities/Space_Engineering_Technology/Structures/Composite_Materials_structures, Oct. 20, 2014, 2 pgs.

"Orbital ATK", Coilable Boom Systems. Technical report, Oct. 18, 1989, 2 pgs.

"Space solar power limitless clean energy from space", National Space Society, printed Jun. 29, 2017 from http://www.nss.org/settlement/ssp/, May 2017, 11 pgs.

Aguirre-Martinez et al., "Development of a Continuous Manufacturing Method for a Deployable Satellite Mast in Cfrp", 15th Reinforced Plastics Congress 1986., (September), pp. 107-110, 1986.

Aieta et al., "Aberration-Free Ultrathin Flat Lenses and Axicons at Telecom Wavelengths Based on Plasmonic Metasurfaces", Nano Lett., Web publication date Aug. 2012, vol. 12, No. 9, pp. 4932-4936.

Aieta et al., "Multiwavelength achromatic metasurfaces by dispersive phase compensation", Science, Mar. 20, 2015, vol. 347, No. 6228, pp. 1342-1345, doi: 10.1126/science.aaa2494.

Amacher et al., "Thin ply composites: Experimental characterization and modeling of size-effects", Composites Science and Technology, Jul. 11, 2014, vol. 101, pp. 121-132.

Andryieuski et al., "Rough metal and dielectric layers make an even better hyperbolic metamaterial absorber", Optics Express, Jun. 11, 2014, vol. 22, No. 12, p. 14975-14980.

Aoki et al., "A Fully Integrated Quad-Band GSM/GPRS Power Amplifier", IEEE Journal of Solid-State Circuits, vol. 43, Issue 12, Dec. 12, 2008, pp. 2747-2758.

Arai, "Pitch-based carbon fiber with low modulus and high heat conduction", Nippon Steel Technical Report No. 84, Jul. 11, 2001, pp. 12-17.

Arbabi et al., "Multiwavelength polarization insensitive lenses based on dielectric metasurfaces with meta-molecules", Optics, Jan. 22, 2016, vol. 3, Issue 6, pp. 628-633.

Arbabi et al., "Subwavelength-thick lenses with high numerical apertures and large efficiency based on high-contrast transmitarrays", Nature Communications, May 5, 2015, vol. 6, p. 7069, doi:10.1038/ncomms8069.

Arbabi et al., "Dielectric Metasurfaces for Complete Control of Phase and Polarization with Subwavelength Spatial Resolution and High Transmission", Nature Nanotechnology, Aug. 31, 2015, 27 pgs., doi:10.1038/nnano.2015.186.

Arya, "Packaging and Deployment of Large Planar Spacecraft Structures", Thesis of Manan Arya, May 2, 2016, 131 pgs.

Arya et al., "Ultralight Structures for Space Solar Power Satellites", American Institute of Aeronautics and Astronautics, 2016, pp. 1-18.

Arya et al., "Wrapping Thick Membranes with Slipping Folds", American Institute of Aeronautics and Astronautics, date unknown, pp. 1-17.

Bakr et al., "Impact of phase and amplitude errors on array performance", UC Berkeley Technical Report No. UCB/EECS-2009-1. Retrieved from http://www.eecs.berkeley.com/Pubs/TechRpts/2009/EECS-2009-1.html, Jan. 1, 2009, 12 pgs.

Banik et al., "Performance Validation of the Triangular Rollable and Collapsible Mast", Proceedings of the 24th Annual AIAA/USU Conference on Small Satellites, Logan, UT, Aug. 9, 2010, 8 pgs.

Banik et al., "Verification of a Retractable Solar Sail in a Thermal-Vacuum Environment", 51st AIAA/ASME/ASCE/AHS/ASC Structures, Structural Dynamics, and Materials Conference, Apr. 12-15, 2010, Orlando, Florida, 11 pgs., doi: 10.2514/6.2010-2585.

Bapanapalli et al., "The Effect of Tool-Part Interactions on the Geometry of Laminated Composites", Washington State University, Jul. 10, 2016.

Biddy et al., "LightSail-1 solar sail design and qualification", Proceedings of the 41st Aerospace Mechanisms Symposium, May 16, 2012, pp. 451-463.

Bohn et al., "Fully Integrated Frequency and Phase Generation for a 6-18GHz Tunable Multi-Band Phased-Array Receiver in CMOS", Radio Frequency Integrated Circuits Symposium (RFIC), Apr. 17-Jun. 17, 2008. IEEE, pp. 439-442.

Borriello et al., "Ab initio investigation of hybrid organic-inorganic perovskites based on tin halides", Physical Review B, Jun. 23, 2008, vol. 77, 235214, 9 pgs.

Brongersma et al., "Light management for photovoltaics using high-index nanostructures", Nature Materials, vol. 13, No. 25, May 2014, pp. 451-460.

Cahill et al., "Nanoscale thermal transport. II. 2003-2012", Applied Physics Review, Jan. 14, 2014, vol. 1, No. 1, p. 011305-1-011305-45.

Calladine et al., "The theory of thin shell structures 1888-1988", Proceedings of the Institution of Mechanical Engineers, Part A: Journal of Power and Energy, vol. 202, No. 3, Jan. 7, 1988, pp. 141-149.

Callahan et al., "Light trapping in ultrathin silicon photonic crystal superlattices with randomly-textured dielectric incouplers", Optics Express, vol. 21, Issue 25, DOI: 10.1364/OE.21.030315, 2013, pp. 30315-30326.

Campbell et al., "A Pixel Readout Chip for Mrad in Standard 0.25um CMOS", IEEE Transactions on Nuclear Science, vol. 46, issue: 3, Jun. 1999, pp. 156-160.

Cao et al., "A 4.5MGy TID-Tolerant CMOS Bandgap Reference Circuit Using a Dynamic Base Leakage Compensation Technique", IEEE Transactions on Nuclear Science, vol. 60, issue 4, Aug. 2013, pp. 2819-2824.

Castle Jr., "Heat conduction in carbon materials", 1st Biennial Conference of the American Carbon Society, pp. 13-19, Nov. 2, 1953.

Chen et al., "Planar Heterojunction Perovskite Solar Cells via Vapor-Assisted Solution Process", Journal of the American Chemical Society 136, Dec. 20, 2013, pp. 622-625.

Cheng et al., "Optical metasurfaces for beam scanning in space", Optics Letters, May 1, 2014, vol. 39, No. 9, pp. 2719-2722.

Conings et al., "Intrinsic thermal instability of methylammonium lead trihalide perovskite", Advanced Energy Materials, Jun. 2, 2015, DOI: 10.1002/aenm.201500477, 8 pgs.

(56) References Cited

OTHER PUBLICATIONS

David, "Extraterrestrial mining could reap riches and spur exploration", http://www.space.com/16273-extraterrestrial-mining-asteroids-moon.html, Jun. 25, 2012, 7 pgs.

Delapierre et al., "Spin-Stabilized Membrane Antenna Structures", American Institute of Aeronautics and Astronautics, date unknown, pp. 1-15.

Du Toit et al., "Advances in the design of Jaumann absorbers", in Antennas and Propagation Society International Symposium, 1990 AP-S, Merging Technologies for the 90's Digest, May 7, 1990, vol. 3, pp. 1212-1215.

Elfiky et al., "Study the effects of proton irradiation on GaAs/Ge solar cells", 35th IEEE Photovoltaic Specialist Conference, Jul. 2010, pp. 002528-002532.

Emerson, "Electromagnetic wave absorbers and anechoic chambers through the years", IEEE Trans. Antennas Propag., vol. 21, No. 4, Jul. 1973, pp. 484-490.

Eperon et al., "Morphological Control for High Performance, Solution-Processed Planar Heterojunction Perovskite Solar Cells", Advanced Functional Materials 24, first published Sep. 9, 2013, pp. 151-157.

Ersoy et al., "An experimental method to study the frictional processes during composites manufacturing", Composites Part A: Applied Science and Manufacturing, Feb. 19, 2005, vol. 36, No. 11, pp. 1536-1544.

Estvanko et al., "Numerical analysis of a tape spring hinge folded about two axes", Earth and Space 2012© Engineering, Science, Construction, and Operations in Challenging Environments, ASCE, Jul. 11, 2012, pp. 714-721.

Fallahi et al., "Thin wideband radar absorbers", Transactions on Antennas and Propagation, Nov. 30, 2010, vol. 58, No. 12, pp. 4051-4058.

Fante et al., "Reflection properties of the Salisbury screen", IEEE Transactions on Antennas and Propagation, Oct. 1988, vol. 36, No. 10, pp. 1443-1454.

Fernandez, "Advanced Deployable Shell-Based Composite Booms For Small Satellite Structural Applications Including Solar Sails", International Symposium on Solar Sailing, Jan. 17-20, 2017, Kyoto, Japan, 19 pgs.

Fernlund, "Experimental and numerical study of the effect of cure cycle, tool surface, geometry, and lay-up on the dimensional fidelity of autoclave-processed composite parts", Composites—Part A: Applied Science and Manufacturing, 33(3):341-351, 2002.

\* cited by examiner

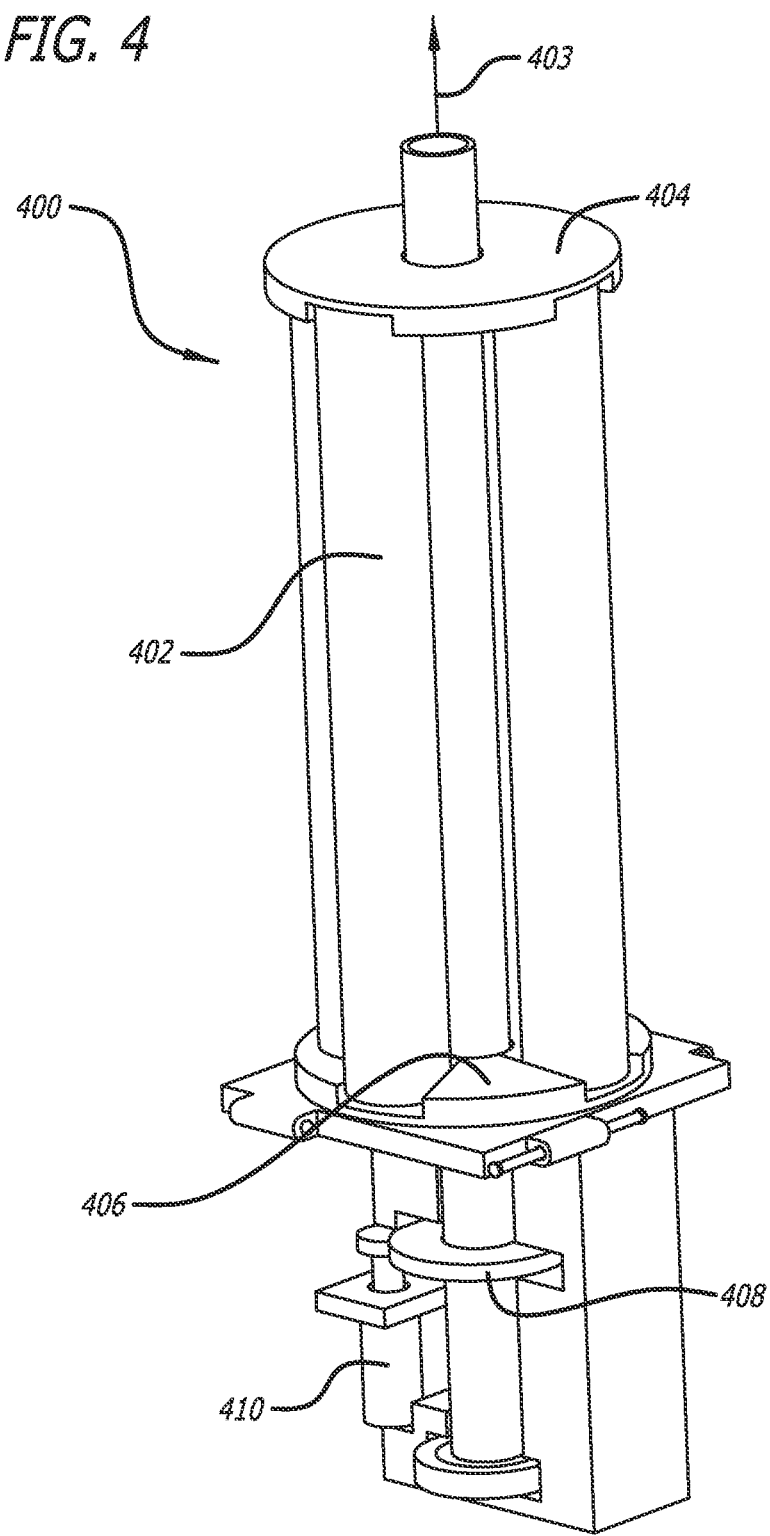

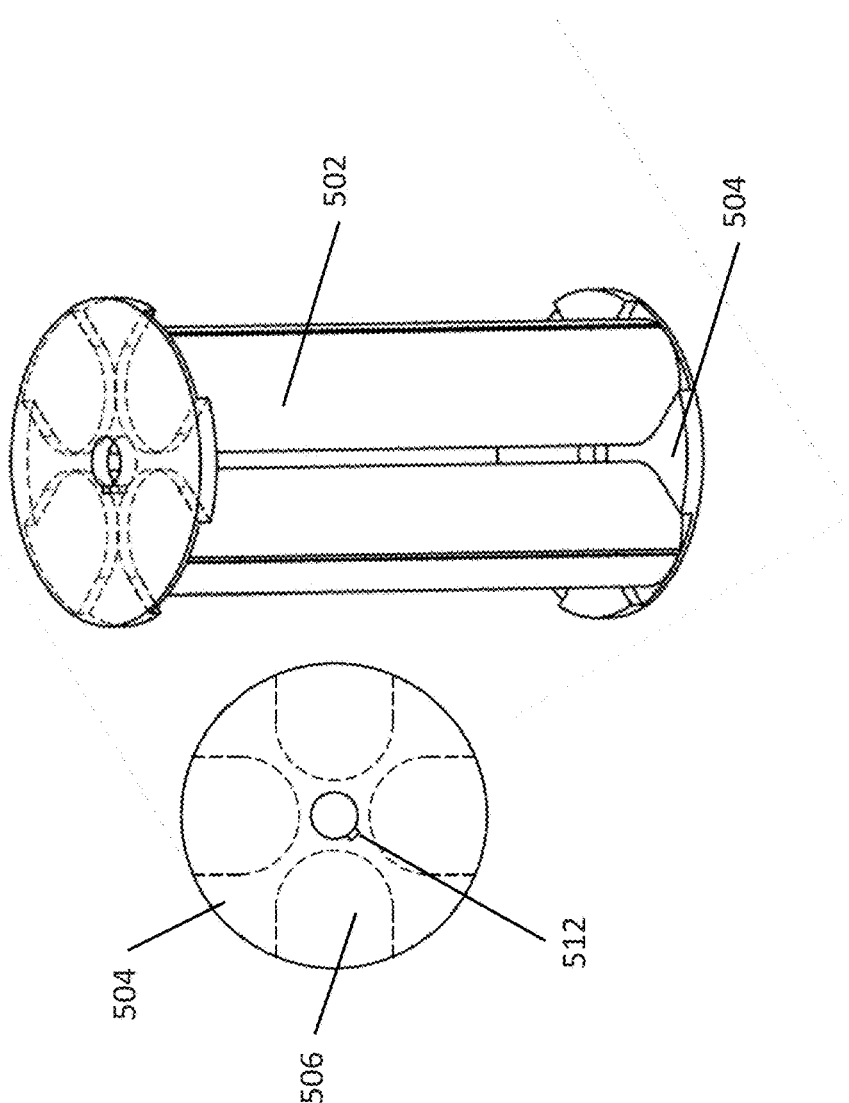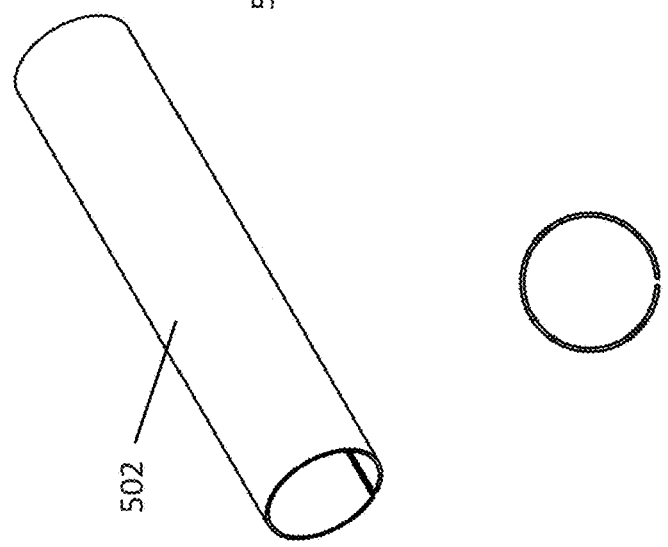

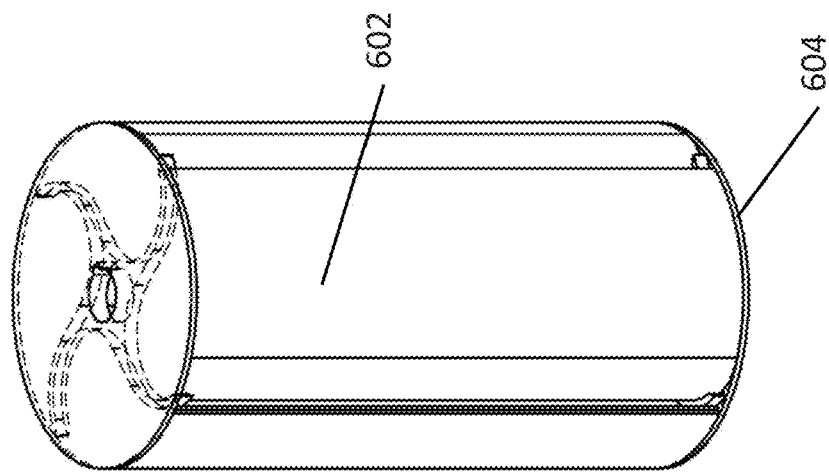
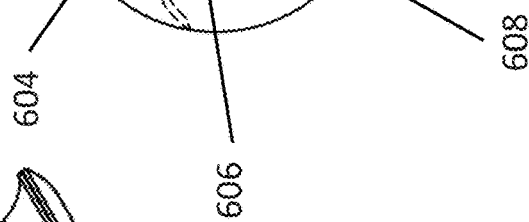
Fig. 6B
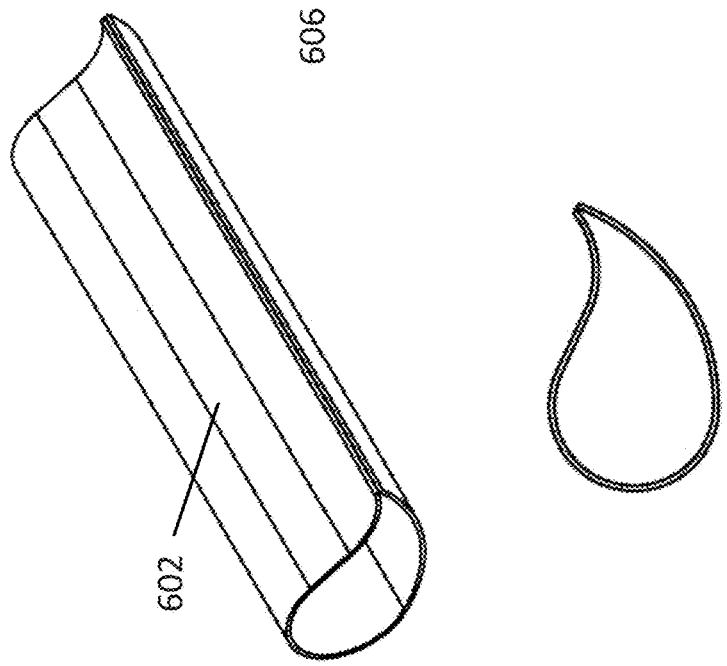
Fig. 6A

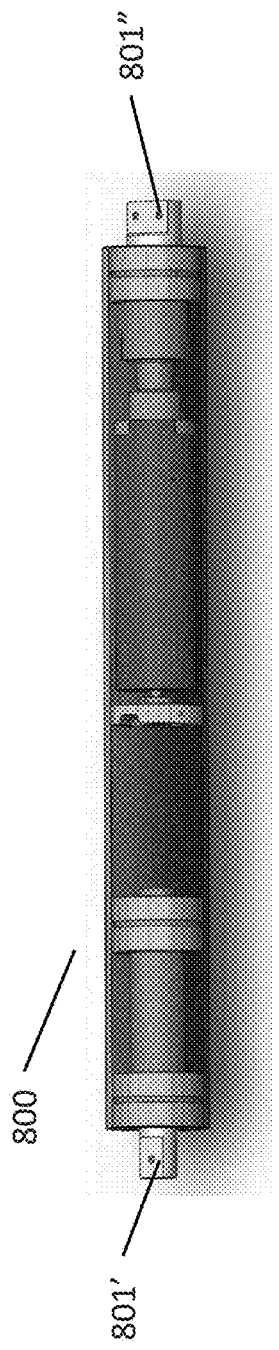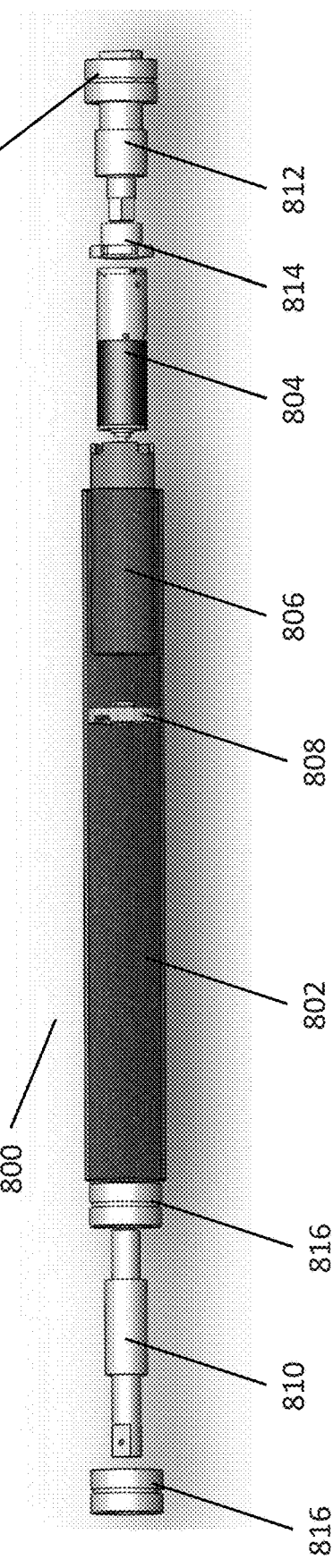

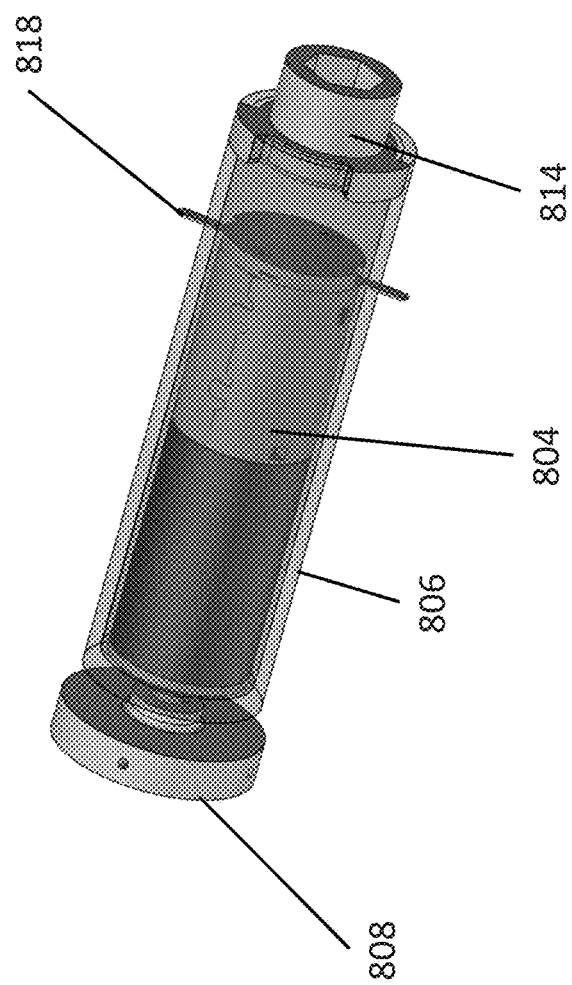

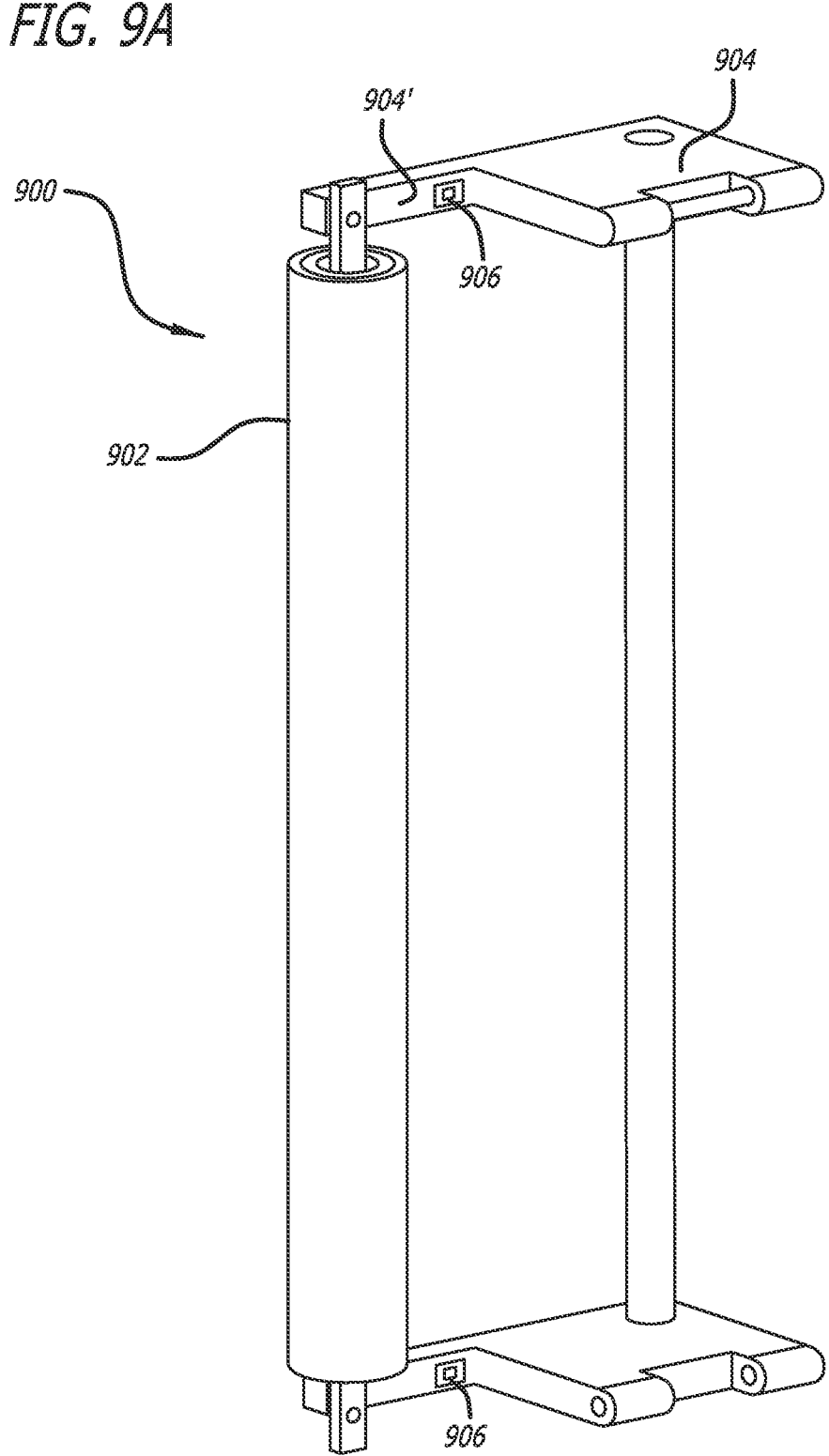

ACTIVELY CONTROLLED SPACECRAFT DEPLOYMENT MECHANISM

CROSS-REFERENCED APPLICATIONS

This application claims priority to U.S. Provisional Patent Application No. 62/753,373 filed on 31 Oct. 2018. The enclosure of which is included herein by reference in its entirety.

FIELD OF THE INVENTION

The present invention generally relates to space based satellites and mechanisms used in the compaction and deployment of one or more components of the satellites. More specifically the present invention is related to compaction and deployment mechanisms that can maintain a deployable structure in a specified configuration for any length of time and subsequently control the deployment of such structure.

BACKGROUND OF THE INVENTION

Satellites and other deployable devices are often designed to fit within small form factors so that they can be placed in a variety of environments such as a primary or secondary payload space on a propulsion type distribution system. Many such propulsion systems come in the form of rocket propelled devices with the payload attached. Others may be more terrestrial based distribution systems with payloads deigned to fit within specified form factors. In conjunction with smaller form factor, many deployable devices are designed to take advantage of a variety of materials such as plastics, composites, and/or lightweight metals such as titanium and aluminum that help to better manage the flight characteristics and energy requirements of the distribution systems. As such, Ultra-light deployable structures are advantageous in aerospace and potentially terrestrial applications as a result of their light weight and smaller form factor package volume.

Designers of deployable structures also have to take into account the various environments in which they could be deployed. Accordingly, many designs incorporate various types of deployment mechanisms including motors, pulleys, tension lines, booms and/or resilient elements to help properly deploy the device in the desired environment. Furthermore, many deployable devices must take into account the structural integrity of the deployed structure that is to be packaged within the desired form factor. This can lead to the use of less structurally stable materials in the manufacture of the deployed structure and many manufactures tend to compensate by using stronger heavier materials to aid in the deployment of such structures. However, the desire to reduce weight and size as well as maintain structural integrity provides for continual improvement on previous designs.

BRIEF SUMMARY OF THE INVENTION

Many embodiments are directed to a deployment mechanism capable of actively deploying and/or compacting a deployable structure. Many embodiment are made up of the following:
a central assembly wherein the central assembly further comprises;
  a plurality of compaction rollers disposed between a top plate and bottom plate wherein the top and bottom plate hold the plurality of compaction rollers around a central axis and wherein both the top and bottom plate have a centrally located aperture where each of the plurality of rollers is concentrically located around the aperture;
  a lower support plate connected to the central assembly such that it supports the central assembly and allows the central assembly to rotate about a central axis wherein the central axis is located concentrically with the aperture;
  an upper support plate disposed on an upper end of the central assembly such that it allows for the rotation of the central assembly about the central axis;
  a plurality of roller arm assemblies wherein each of the roller arm assemblies further comprises an outer roller disposed between an upper and a lower support platform and wherein the outer roller is connected to a roller motor suited to control the rotation of the outer roller about its longitudinal axis, and wherein the upper support platform is configured to be releasably attached to the upper support plate and wherein the lower support platform is rotatably attached to the lower support plate;
  a plurality of membranes having a first end and a second end wherein the second end is releasably connected to each of the compaction rollers and the first end is connected to an outer roller such that the rotation of the central assembly applies a tension on each of the plurality of membranes; and
  a compaction control motor disposed beneath the lower support plate and connected to a central control shaft wherein the shaft has a first end and a second end where the first end is connected to the control motor and the second end is connected to the top plate and wherein the compaction control motor rotates the central assembly about the central axis in a direction opposite that of the rotation of the roller motor.

In other embodiments, the deployment mechanism further comprises a release mechanism to release the each of the upper platforms from the upper support plate once the deployment of the deployable structure has reached at least a partially deployed state.

In still other embodiments, the release mechanism is disposed on an upper portion of the upper support plate and is releasably connected to each of the plurality of roller arm assemblies.

In yet other embodiments, the upper support plate is a release mechanism and is releasably connected to each of the plurality of roller arm assemblies In still yet other embodiments, the deployment mechanism further comprises a motor housing wherein the motor housing supports the compaction motor.

In other embodiments, the deployment mechanism further comprises a tension control mechanism wherein the tension control mechanism further comprises at least one tension sensor connected to an support platform and electronically connected to a motor control system and wherein the motor control system is connected to the roller motor such that the motor control system regulates the rotational speed of the roller motor In yet other embodiments, the compaction roller has a circular cross section.

In still yet other embodiments, the compaction roller has a teardrop cross section.

In other embodiments, the upper and lower plate further comprise a plurality of control grooves disposed in a surface of the plate and cooperatively engaged with a corresponding compaction roller such that the control groove prevents radial movement of the compaction roller during rotation of the central assembly.

In yet other embodiments, the control grooves are configured to engage with a compaction roller of a circular cross section.

In still yet other embodiments, the control grooves are configured to engage with a compaction roller of a teardrop cross section.

In other embodiments, the deployment mechanism further comprises a plurality of compaction roller cages wherein the cages are disposed between the top and bottom plates and wherein each of the plurality of roller cages corresponds to a compaction roller In yet other embodiments, the compaction roller cages have a circular cross section.

In still yet other embodiments, the compaction roller cages have a teardrop cross section.

In other embodiments, the release mechanism comprises a plurality of hinge clips each of the hinge clips are engaged with a corresponding trigger, wherein the trigger can rotate away from the hinge clips, and wherein the rotation of the trigger is controlled by rotational gear.

In yet other embodiments, the deployment mechanism further comprises a plurality of support booms each of the support booms having an elongated body and a first end and a second end, where the first end is connected to a support plate disposed near the bottom portion of the central assembly and where the second end is positioned distal to the central assembly.

In still yet other embodiments, the rotational gear is a ratchet gear.

In other embodiments, the deployment mechanism further comprises a guide line, wherein the guide line extends from the central assembly to the second end of the support boom.

In yet other embodiments, the boom is manufactured from a material selected from the group consisting of metal, metal alloys, and composite.

In still yet other embodiments, the guide line is placed under tension

Other embodiments, include a method of deploying a compacted structure where the method includes:
  obtaining a deployment mechanism wherein the deployment mechanism comprises;
    a central assembly wherein the central assembly further comprises;
      a plurality of compaction rollers disposed between a top plate and bottom plate wherein the top and bottom plate hold the plurality of compaction rollers around a central axis and wherein both the top and bottom plate have centrally located aperture where each of the plurality of rollers is concentrically located around the aperture;
      a lower support plate connected to the central assembly such that it supports the central assembly and allows the central assembly to rotate about a central axis wherein the central axis is located concentrically with the aperture;
      an upper support plate disposed on an upper end of the central assembly such that is allows for the rotation of the central assembly about the central axis;
    a plurality of roller arm assemblies wherein each of the roller arm assemblies further comprises an outer roller disposed between an upper and a lower support platform and wherein the outer roller is connected to a roller motor,
    and wherein the upper support platform is configured to be releasably attached to the upper support plate and wherein the lower support platform is rotatably attached to the lower support plate and wherein the outer roller is;
    a plurality of membranes having a first end and a second end wherein the second end is releasably connected to each of the compaction rollers and the first end is connected to an outer roller such that the rotation of the central assembly can apply a tension on each of the plurality of membranes; and
    a compaction control motor disposed beneath the lower support plate and connected to a central control shaft wherein the shaft has a first end and a second end where the first end is connected to the control motor and the second end is connected to the top plate and wherein the compaction control motor rotates the central assembly about the central axis in a direction opposite that of the rotation of the roller motor;
  installing a compactible structure within the deployment mechanism;
  activating the compaction control motor of the deployment mechanism such that the central assembly rotates in a first direction to compact the compactible structure and wherein the roller motor is activated to rotate in a second direction wherein the compaction motor thereby applies tension to the membrane which subsequently applies a pressure across the surface of the compactible structure.

Other embodiments, include A method for deploying a compactible structure, where deploying the structure includes:
  Obtaining a deployment mechanism with a compacted structure wherein the deployment mechanism comprises;
    A central assembly wherein the central assembly further comprises;
      a plurality of compaction rollers disposed between a top plate and bottom plate wherein the top and bottom plate hold the plurality of compaction rollers around a central axis and wherein both the top and bottom plate have centrally located aperture where each of the plurality of rollers is concentrically located around the aperture;
      a lower support plate connected to the central assembly such that it supports the central assembly and allows the central assembly to rotate about a central axis wherein the central axis is located concentrically with the aperture;
      An upper support plate disposed on an upper end of the central assembly such that is allows for the rotation of the central assembly about the central axis;
    A plurality of roller arm assemblies wherein each of the roller arm assemblies further comprises an outer roller disposed between an upper and a lower support platform and wherein the outer roller is connected to a roller motor,
    and wherein the upper support platform is configured to be releasably attached to the upper support plate and wherein the lower support platform is rotatably attached to the lower support plate and wherein the outer roller is;
    A plurality of membranes having a first end and a second end wherein the second end is releasably connected to each of the compaction rollers and the first end is connected to an outer roller such that the rotation of the central assembly can apply a tension on each of the plurality of membranes; and A compaction control motor disposed beneath the lower support plate and connected to a central control shaft wherein the shaft has a first end and a second end where the first end is connected to the control motor and the second end is connected to the top plate and wherein the compaction control motor rotates the central assembly about the central axis in a direction opposite that of the rotation of the roller motor;

activating the compaction control motor of the deployment mechanism such that the central assembly rotates in a first direction to deploy the compactible structure and release the tension on the membrane thereby releasing applied pressure from the membrane and wherein the roller motors are activated to rotate in a second direction thereby maintaining a desired tension on the membrane allowing the compacted structure to extend outwardly from the central assembly.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 4 illustrates a perspective view of a central assembly in accordance with embodiments.

FIG. 5A illustrates a cross sectional view of a tear in accordance with embodiments.

FIG. 5B illustrates a perspective view of a plate and plate and tear configuration in accordance with embodiments.

FIG. 6A illustrates a cross sectional view of a tear in accordance with embodiments.

FIG. 6B illustrates a perspective view of a plate and plate and tear configuration in accordance with embodiments

FIG. 8B through 8C illustrate a roller assembly in accordance with embodiments.

FIG. 9A illustrate a roller arm control assembly in accordance with embodiments.

DETAILED DESCRIPTION OF THE INVENTION

Figure 1:
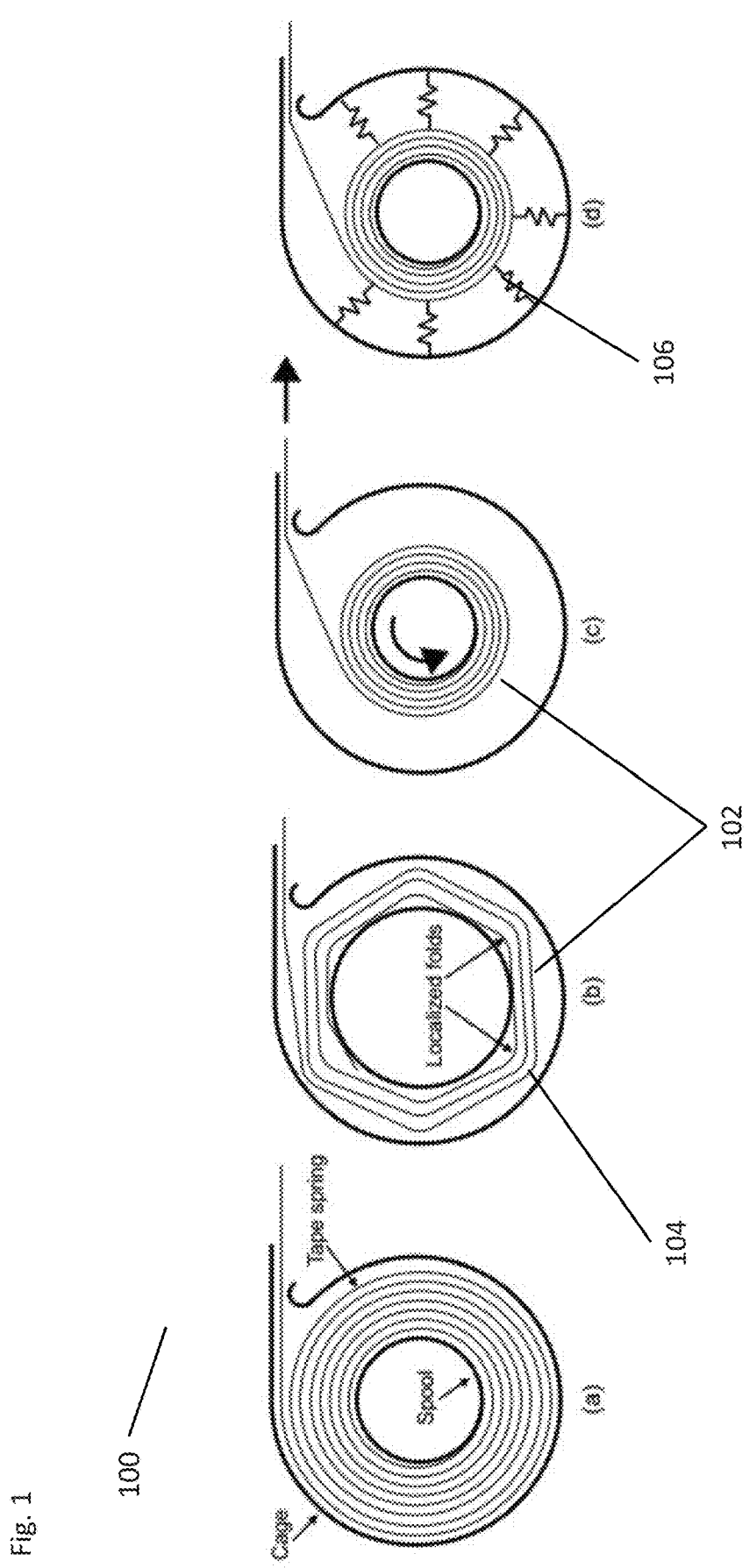
FIG. 1 illustrates various deployment mechanisms and methods in accordance with known art.

Turning now to the drawings, systems and methods for actively deploying spacecraft structures is described. Many embodiments include an actively controlled deployment mechanism that has multiple components designed to actively control the deployment and compaction of a spacecraft structure. Many embodiments include a plurality of tears or internal rollers as well as external rollers. In many embodiments, the internal rollers are affixed about a central shaft by way of a top and bottom rotational plate. The internal rollers and the rotational plates are configured to rotate about the central shaft which may be controlled by a control motor and associated gearing mechanism. Additionally, the internal rollers may be configured to cooperatively and releasably engage with each of the rotational support plates Each of the external rollers is positioned between an upper and lower support arm that are connected to an upper release assembly and a lower support plate. The upper release plate and the lower support plate may be configured to engage with the rotational plates while supporting the external rollers. The external rollers may be configured to remain in a fixed position while the internal rollers rotate about the axis of the central shaft. Additionally, each of the external rollers may be connected to an internal roller with a membrane. The membrane can be maintained under tension during a compaction process by the active control of the rotation of each of the external rollers. The active control of the tension of the membrane can apply a continuous and uniform pressure to a deployable structure during compaction. Likewise, during deployment the tension can be maintained on the membrane to control the deployment of the deployable structure.

The development of compactible structures has been of increasing interest in various fields including space based applications. For example, many satellite manufactures have sought for smaller platforms and form factors from which to launch the various structures to help reduce the energy requirements of the distribution device. Furthermore, deployment mechanisms maintain the deployable structure packaged for a specified duration, manage its deployment at a specific point in time, and maintain compatibility with the structure's function in its deployed state. During those phases the deployment mechanism must maintain the integrity of the deployable structure. Accordingly, many developers have looked to alternate methods of compaction as well as alternate material choices for the compactible structure. Many such choices have led to using thinner materials that pose unique challenges for meeting the packaging and storage requirements. One of the failure modes that has been observed in deployable structures during the packaged state and during the deployment phase is local buckling of the structure.

Different packaging methods have been used and/or proposed such as coiling and/or folding the structure, however, such methods still can be plagued with the structural integrity problems. Previous attempts to address this challenge were based on maintaining the deployable structure under tension during the deployment phase. Typically, the folded and/or coiled structures, including tension controlled, are deployed by releasing the constraints applied during packaging and letting the structure self-deploy using its stored elastic energy. However, this sacrifices control over the deployment process, which is characterized by the formation and propagation of localized folds.

Although unconstrained deployment has been successfully demonstrated for deployable booms, it would not be reliable when deploying more complex structures, consisting of multiple folded shells. In such cases, the uncertainty on the deployment path of each shell would likely lead to chaotic and unpredictable behavior, potentially damaging the structure or resulting in incomplete deployment. Hence, additional constraints exerted by a deployment mechanism can be introduced to guide the shells along a nominal deployment path. Furthermore, while the use of booms has been successful, such designs are often heavy and bulky due to the requirement for high tension during the deployment of the structure.

Coiling methods in accordance with known methods of coiling under tension and or compression can be illustrated in FIG. 1. FIG. 1 illustrates different coiling methods 100 along with different systems and methods for maintaining the compaction configuration and structural integrity of the compacted structure 102. Some methods illustrated (a-c) aim to coil the structure 102 under tension. However, such methods can lead to added stresses on the localized folds 104 that can occur in different structures 102. Furthermore, many such methods can require an external tensioning device that requires structural counteraction or counterbalance the typically comes from a deployable boom. Accordingly, such external tensioning devices can impose significant load bearing requirements on the boom. Additionally, some methods can use localized pressure as illustrated in (d) by way of locally placed springs 106. Such springs 106 and other localized pressure can present potential points of damage on the compacted structure and have proven difficult to optimize for controlled deployment of the structure.

Embodiments of a Deployment Mechanism

Figure 2:
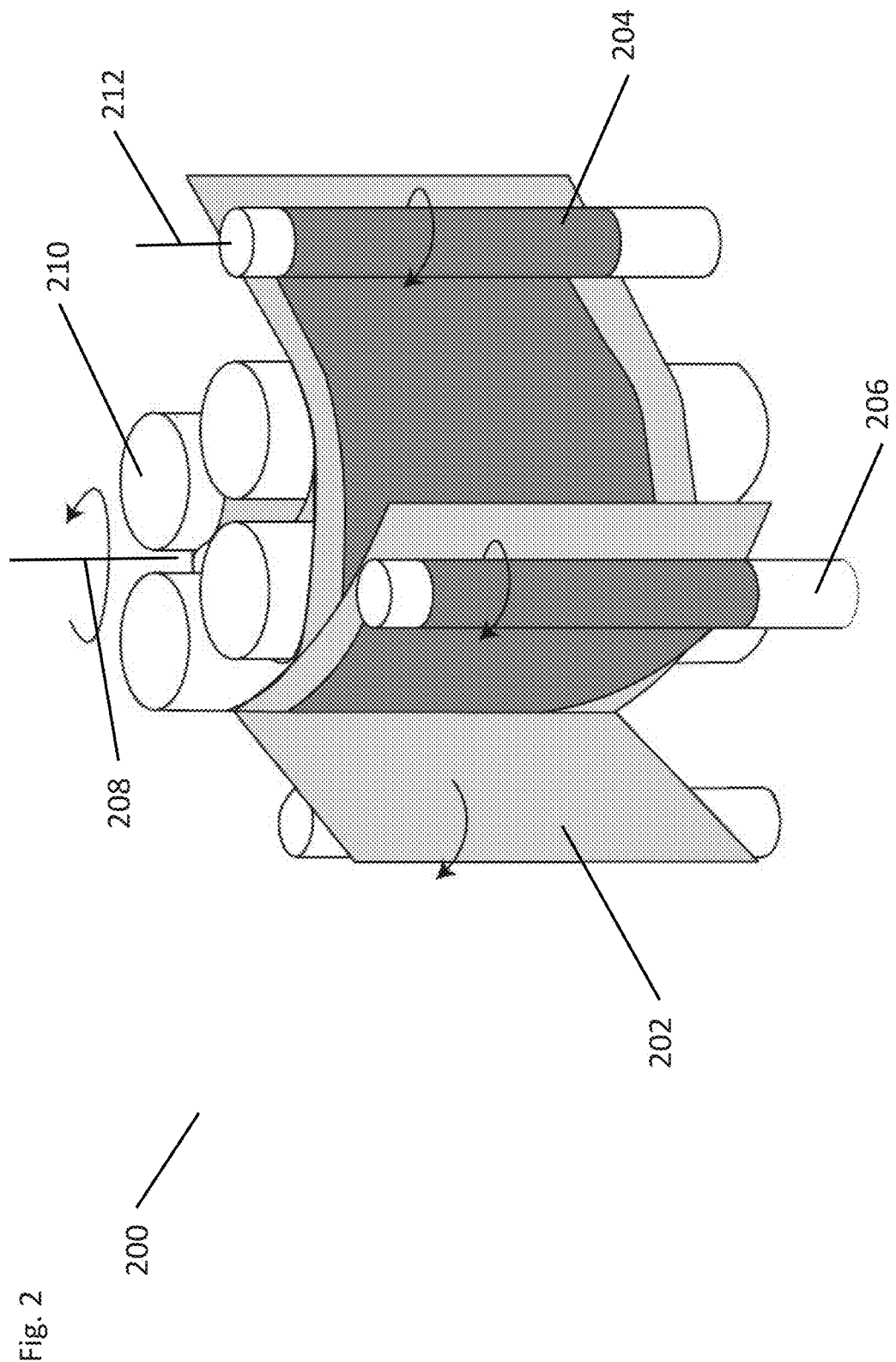
FIG. 2 illustrates a deployment mechanism in accordance with embodiments.

Turning now to FIGS. 2-19, embodiments of systems and methods for controlled deployment mechanism are illustrated. For example, FIG. 2 illustrates a deployment mechanism 200, which preserves the structural integrity by applying pressure on the deployable structure 202 during compaction and throughout the deployment. This is achieved by using membranes 204 wrapped with the deployable structure 202 during packaging to apply a pressure on the deployable structure 202. The membranes 204 can be held under tension by actively controlled external rollers 206. When the mechanism 200 rotates about a centralized axis 208 the membranes 204 and the deployable structure 202 are wrapped around one or more tears 210 and the tensioned membranes 204 apply a pressure across the surface of the deployable structure 202. This pressure can be controlled to an arbitrary value and may be uniform across the deployable structure 202. The level of tension required is dependent on the physical characteristics, such as strain energy and mechanical properties, of deployable structure 202. Likewise, the physical characteristics of the external roller 206, the membrane 204, and the active control component (not shown) can determine the level of pressure that can and should be applied to the deployable structure. Accordingly, in accordance with many embodiments the tension on the membrane and subsequent pressure on the deployable structure may vary greatly based on a number of factors including form factor for the deployable mechanism. In accordance with many embodiments, the membranes may be made of any number of suitable materials. For example, some embodiments may utilize a thin plastic film. Other embodiments may use Teflon or Kapton film.

Figure 3A:
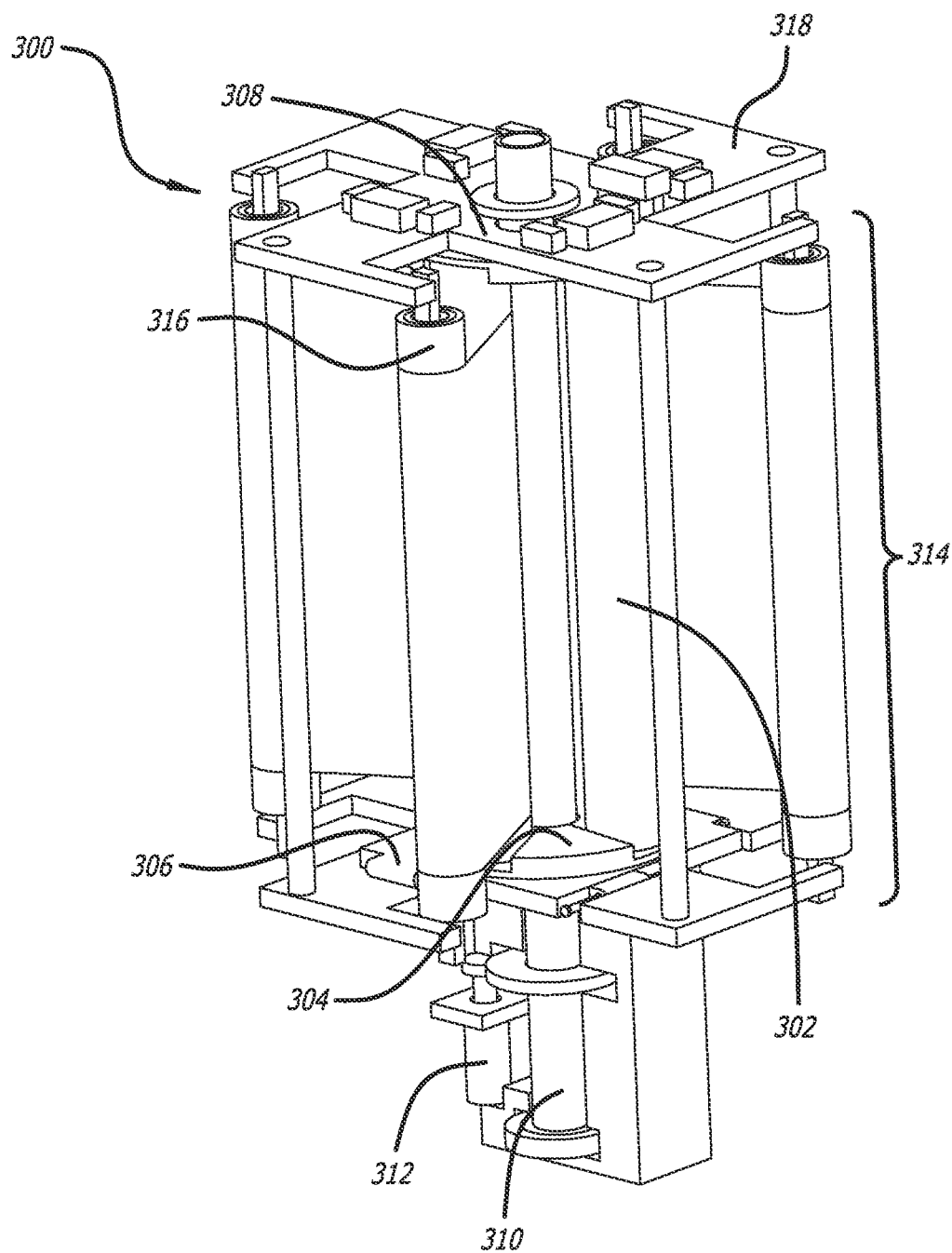
FIG. 3A illustrates a perspective view of a deployment mechanism.
Figure 3B:
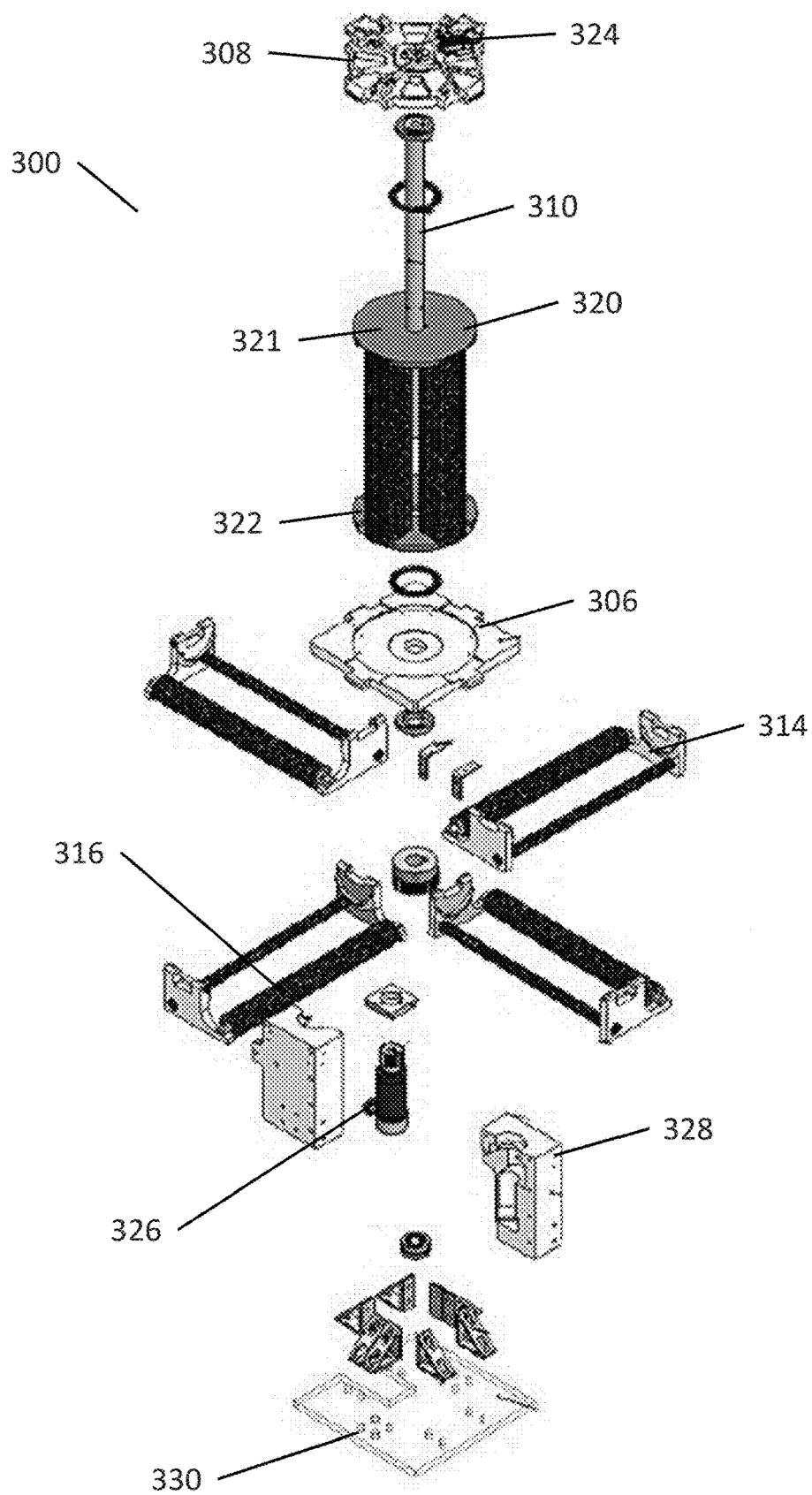
FIG. 3B illustrates an exploded view of a deployment mechanism.

Referring to FIGS. 3A and 3B, embodiments of a deployment mechanism 300 can be illustrated. FIG. 3A illustrates an embodiment of a deployment mechanism 300 where internal tears 302 are supported by an upper (not shown) and lower rotational plate (304). In many embodiments, the rotational plates (304) are further supported at each end of the tears 302 by an upper and lower fixed plate (306 & 308). Each of the rotational plates may be configured to rotate within the confines of the support plates (306&308) and about a central shaft 310. In many embodiments the central shaft 310 extends the length of the deployment mechanism and is connected to a control motor and gearing system 312. The control motor is therefore configured to control the rotation of the shaft 310 and likewise the internal tears 302 within the support plates. In some embodiments the control motor may be connected to the bottom support plate.

Many embodiments incorporate one or more external roller arm assemblies 314 in conjunction with the rotatable internal tears 302. The roller arm assemblies 314, in accordance with many embodiments, may have an actively controlled external roller 316 that is supported and subsequently connected to the upper and lower support plates (306 & 308) by support platforms 318. As will be described in greater detail with respect to additional embodiments, the roller arm assemblies may be releasably connected to the upper support plate through a release mechanism. In accordance with many embodiments, the configuration of the fixed outer rollers in the roller arm assemblies and the rotatable internal tears allows for the application of pressure across the surface of a deployable structures. As previously described with respect to FIG. 2, a membrane connected to the outer roller 316 and an internal tear 302 can be tensioned through the actively controlled outer roller 316 such that pressure is applied to a deployable structure during a compaction process. In accordance with many embodiments, the pressure may be applied non-uniformly. In other words, in some embodiments the deployable structure may have portions that are not relatively compactible. Accordingly, such embodiments may employ different membranes that only apply pressure to the compactable portions of the deployable structure. Such membranes may have apertures disposed throughout the surface and thus would apply an increased amount of pressure on the deployable structure at the specific compaction locations.

Alternatively, during deployment the tension on the membrane can accordingly be controlled to allow for removal of controlled unwrapping of the deployable structure and subsequent deployment. The rotational control of both the internal tears and external rollers that ultimately allows for the control of pressure applied to the deployable structure. Accordingly, many embodiments, may use a number of control motors and systems to control the tension on the membrane and subsequently the pressure on the deployable structure.

FIG. 3B illustrates an exploded view of a deployment mechanism to better illustrate the various components and assemblies that may be used in various embodiments. For example, as discussed with respect to FIG. 3A, some embodiments may contain the central tears within a central assembly 320 that is bound by an upper and lower rotational plate (321 & 322) (further dissed in FIG. 4). The central assembly 320, as previously discussed may be connected to an upper and lower support plate that allows for the central assembly 320 to rotate about the central shaft 310. Additionally, the upper support plate may provide a central point that the central shaft 310 is connected to allowing assembly to spin about a central axis. In many embodiments this connection may be aided by one or more bearings or bushings or any number of rotational elements to improve the fluid rotation of the central assembly 320. Likewise, a lower plate 306 may be used to support the central assembly and allow for rotation about the central axis.

In accordance with many embodiments, the upper support plate 308 may have a release mechanism or assembly 324 that is designed to release the external roller assemblies 314 from the upper support plate 308. As illustrated in the exploded view in FIG. 3B the external roller assemblies may be disconnected from the upper support plate 308 and rotate away from the central assembly, thus, allowing for a complete deployment of a deployable structure. The outer roller assembly 314, according to many embodiments, is designed to hold the outer rollers 316 for providing tension on the membranes and maintaining a corresponding pressure on the deployable structure. The outer roller assembly 314 and rollers 316 will be discussed in greater detail with respect to FIGS. 8 and 9.

In accordance with many embodiments the outer roller assembly 314 remains in a fixed position with respect to the central shaft 310, which helps to control the tension on the membrane. In many embodiments, the outer roller assemblies 314 may be rotatably connected to the lower support plate 306 such that they can rotate away from the central assembly once the deployable structure has been unwound from the internal tears. Such rotatable connection can be done in any number of ways with any number of hinge type devices. The rotational movement of the outer roller assembly 314 aids the deployable structure in achieving full deployment after the actively controlled deployment from the controlled rotation of the tears and rollers.

Many embodiments may utilize a central drive motor 326 that may be housed in a motor housing 328. In accordance with many embodiments the motor assembly (326 and 326) may be mounted to the bottom support plate 306 and connected to a drive shaft 310 that runs centrally down the center of the central assembly 320. Accordingly, the drive shaft 310 may be connected to both the upper release assembly 324 and the lower support plate 306 by way of bushings. The bushings may be of any suitable design to allow for the unencumbered rotation of the central shaft 310 and central assembly 320. In addition to the various assemblies and other components of the deployment mechanism 300, many embodiments may utilize a base plate assembly 330 that supports the overall mechanism. In many embodiments the base plate may also serve as a support structure for other elements not shown, such as booms and guide lines.

Embodiments of the Central Assembly and Tears

Turning now to FIG. 4 a central assembly 400 is illustrated. The central assembly 400 may contain multiple tears 402 that are concentrically located about a central axis 403. The tears 402 may be held in place by a top and bottom rotation plate 404 and 406. Accordingly, the top and bottom rotation plates (404 and 406) may be designed to spin or rotate about the central axis 403 and be configured to prevent tangential and axial movement of the tears during the rotation of the central assembly. Such movement or prevention of such movement can also be controlled by the tear control motor 408 and associated gears 410.

In accordance with many embodiments, the tears may take on any desired cross sectional shape that is designed to maximize compactability of the structures as well as maintain the structural integrity of the structure during compaction, storage, and deployment. Accordingly, FIGS. 5A-6B illustrate various embodiments of tears and holding plates that may be used in maximizing the output of the centralized assembly and overall deployment mechanism. For example, FIG. 5A illustrates a perspective and top view of a tear 502 with a circular cross section. The circular cross section tear 502 may be placed on a plate 504 illustrated by the embodiment in FIG. 5B. The plate 504, in accordance with many embodiments, may be designed with a central hole 506 that is configured to engage with a central rotational shaft or device (not shown) that can apply a rotational force on the plate 504. Additionally, the plate 504 may be configured with grooves 506 in one surface of the plate 504. The groove 506 may be designed to correspond to the cross sectional shape of the tear and provide a groove path that can allow the tears 502 to slide in and out radial from the plate. The radial movement, generally would be prevented during the rotation of the central assembly during compaction and deployment due to the tension on the membrane which translates to a pressure on the deployable structure and subsequently on the tears 502. The sidewalls of the grooves 506 would act to prevent tangential movements of the tears 502 with respect to the plates 504, effectively transferring the rotation of the central shaft and plates 504 to the tears. Additionally, the pressure on the sidewalls of the grooves 506 would act to counteract the tension on the membrane thereby converting it to a torque on the central shaft (not shown). However, during full deployment of a deployable structure tangential or radial movement may become necessary, thus the grooves 506 can serve multiple purposes in the compaction and deployment of the device. FIG. 5B further illustrates an assembled central assembly in accordance with embodiments. Such embodiments may have a top and bottom plate that are configured to hold the tears 502 in the central assembly. In many embodiments, the tears 502 may be held in place by one or more capture elements or cage type structure 510. The capture elements 510 may have a cross section that corresponds to the tears 502 and surrounds the tears 502. Other embodiments, may only secure the tears 502 within the grooves 506 of the plates 504. In accordance with many embodiments the controlled rotation of the plates and subsequently the tears about the central axis can be achieved by the coupling of the plates to a central shaft (not shown) by way of a key hole 512. The keyhole 512 may engage with a portion of the shaft such that the rotation of the shaft is translated to the rotation of the plates.

Similar to the description of the tear and plate in FIGS. 5A and 5B, FIGS. 6A and 6B illustrate an embodiment of a tear 602 with a teardrop cross section. The teardrop cross section can provide for a different overall compaction of the deployable structure that can apply a more uniform curvature on the deployable structure. Thus, it can help maintain the structural integrity of the deployable structure. In accordance with many embodiments, the top and bottom plates 604 may have holding grooves 606 designed within a surface of the plate 604 and designed to match the cross section of the tear 602. Likewise, as discussed with FIGS. 5A and 5B, the plates associated with a teardrop cross section embodiment are configured to prevent and allow radial movement of the tears at certain times during compaction or deployment. Likewise, many embodiments may have plates 604 with keyways 608 that engage with a key on a central shaft (not shown) to allow for the controlled rotation of the central assembly Although certain embodiments of tears are illustrated, it should be understood that the tears may take on any desirable configuration and cross section such that the structural integrity of the deployable structure is maintained during compaction. Accordingly, many embodiments may employ tears with diameters that are derived from the minimum bending radius of the deployable structure.

Figure 7B:
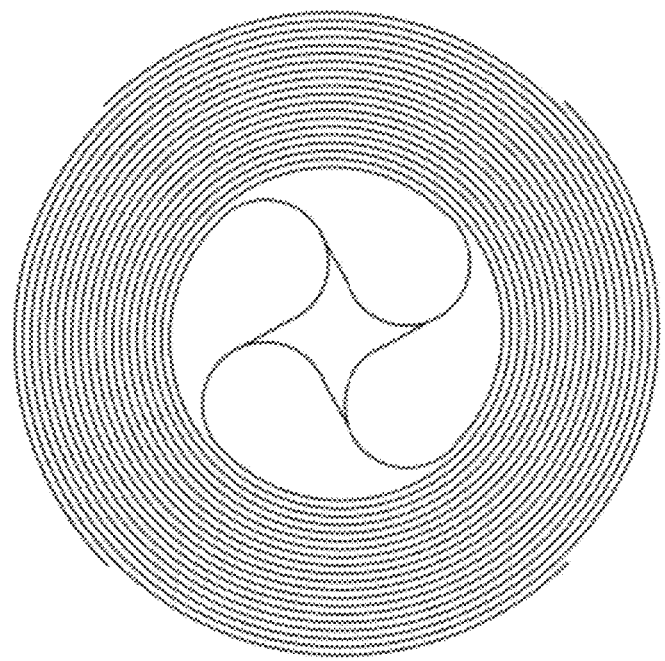
FIGS. 7A and 7B illustrate wrapped configurations of a deployable device in accordance with embodiments.
Figure 7A:
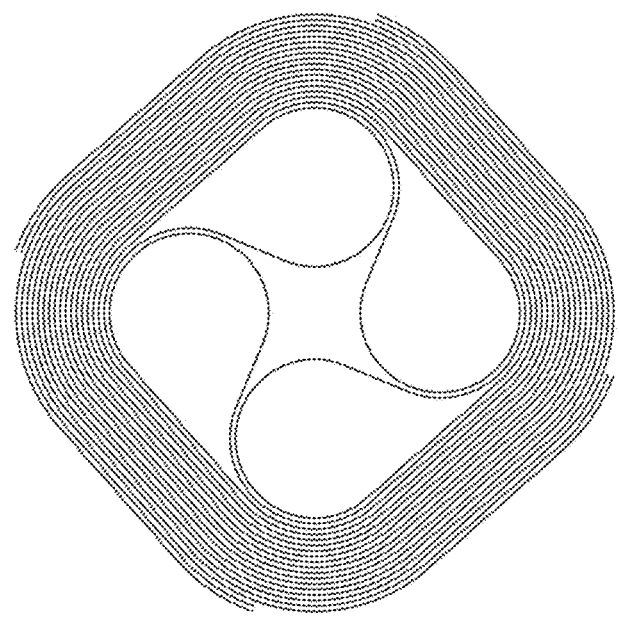

FIGS. 7A and 7B illustrate two different compaction configurations in accordance with embodiments. For example, it can be seen that FIG. 7A illustrates a square type wrapping configuration where the structure 702 is wrapped around tears 704 with a circular cross section. FIG. 7B on the other hand, illustrates a circular wrapping configuration that utilizes tears 702 with a teardrop cross section. Although specific embodiments of a central assembly and tears are illustrated any number of configurations could be used to achieve the pressure across the surface of the deployable structure. Likewise, any number of configurations and cross sectional designs of tears may be used to achieve any number of wrapping configurations that fit the desired form factor criteria as well as the compactability of the deployable structure.

Embodiments of Outer Roller/Arm

Turning now to FIGS. 8A through 9B embodiments of an outer roller and an outer roller assembly. In accordance with many embodiments, the deployment mechanism may be configured with outer rollers. The outer rollers, as previously described, may be connected to the membrane and may be configured to supply tension on the membrane during compaction. The tension translates to a pressure over the surface of the deployable structure during compaction as well as during a controlled deployment.

FIGS. 8A and 8B illustrate an embodiment of an outer roller that may be use within the context of an actively controlled deployment mechanism. FIG. 8A illustrates an assembled roller 800 with an upper and a lower connection point. 801' and 801". The roller 800 may be connected to an upper and lower support platform (not shown) by the connection points (801' & 801"). In accordance with many embodiments, the roller 800 may be made up of a number of components to enable the active control of the roller. For example FIG. 8B illustrates an exploded view of a roller 800. The roller 800 may have a housing or tube 802 that is designed to house various active and passive components of the roller 800. In accordance with many embodiments, the housing 802 may be of any suitable material including metal, plastic, composite, etc. In accordance with many embodiments, the roller assembly 800 may also have a motor/gearbox component 804 that may be positioned within a motor casing 806. The motor casing 806 can subsequently be designed to fit within the housing 802 and engage with the roller housing 802 through a motor-roller coupling 808. The motor roller coupling 808 enables the rotational movement of the motor 804 to be translated to the housing 802 and subsequently allowing the roller assembly 800 to wind or unwind an attached membrane (not shown). Additionally the motor 804 may be connected to a lower shaft 812 by a motor casing holding element 814. In accordance with many embodiments, the rotational motion of the roller assembly 800 may be further aided by the use of bearings 816 disposed at either end and in the middle of the assembly. The bearings may be of any type of bearing that is suitable for the structure. Some embodiments may use ball bearings, needle bearings, roller bearings, etc.

FIG. 8C illustrates a perspective view of a motor casing 806 in accordance with embodiments. It can be seen in greater detail the relation between the motor-roller coupling 808 and the motor 804. Additionally, the motor casing holding element 814 can be illustrated as forming a cap like element on the motor casing 806 that can be connected to a lower shaft (not shown). In many embodiments the design of the holding element 814 allows the lower shaft to apply torque to the motor housing 802 and translated to the motor body 804, thus, preventing the motor 804 from spinning within the housing. In some embodiments, the motor 804 may be connected to the motor casing 806 by a connection element 818 such as a small shaft or lever.

Figure 9B:
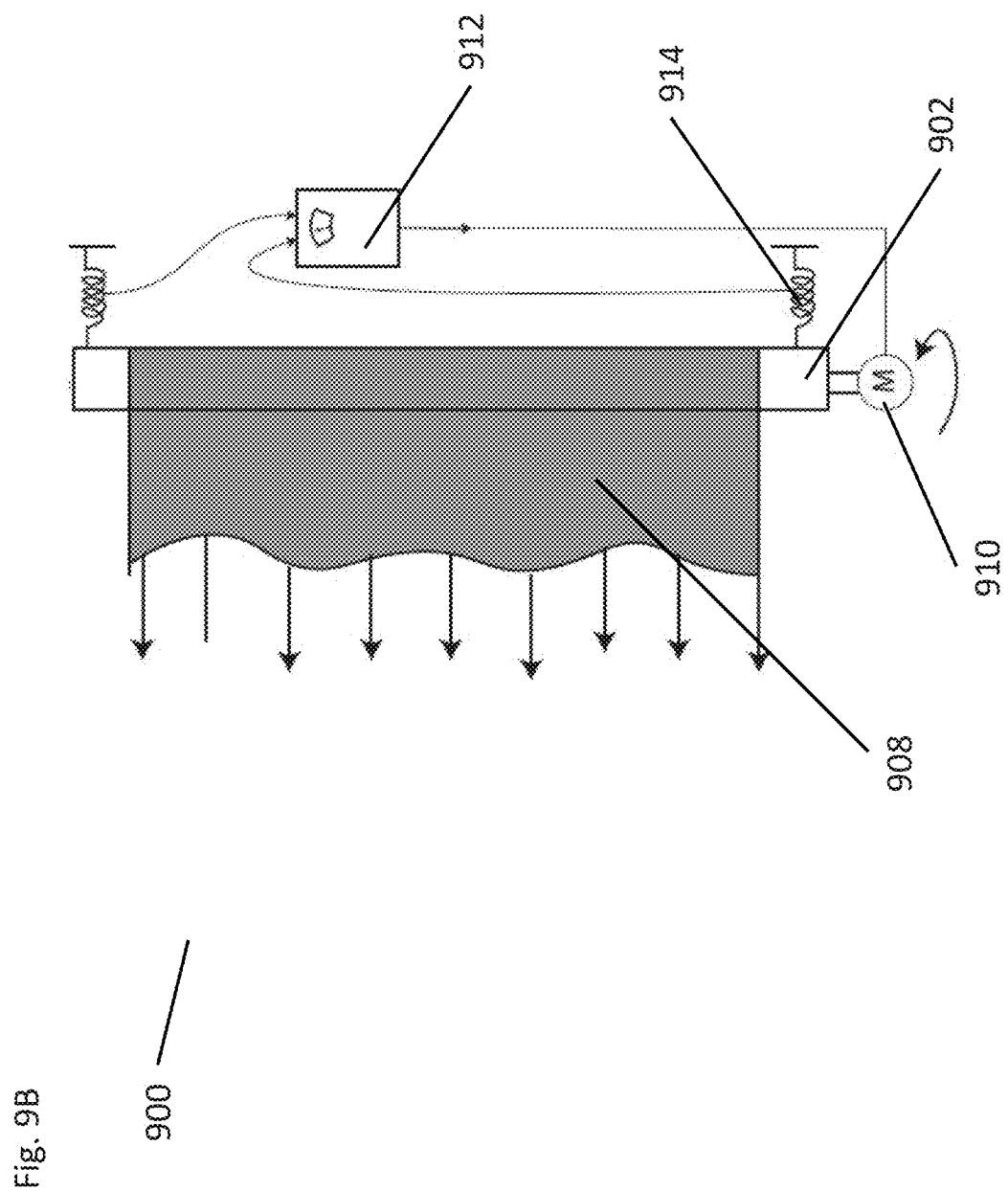
FIG. 9B illustrates a schematic view of a roller arm control assembly in accordance with embodiments.

FIG. 9A illustrates an embodiment of an outer roller assembly 900. The outer roller assembly 900, in many embodiments is made up of an outer roller 902 that is positioned between two support platforms 904. The support platforms 904 may take on any shape or size that is suitable for the form factor and function of the deployment mechanism. For example, some embodiments may use support platforms that have an "L" shape where one end is larger than the other. In accordance with many embodiments, the shape of the support platform 904 can aid in the active control of the outer roller 902 rotational speed. For example the tension on a membrane (not shown) can apply a side force on a smaller portion 904' of the support platform 904, which deflects proportionally to the tension force. Accordingly, the deflection can be measured by a strain gauge 906. In many embodiments, one or more strain gauges may be used. In some embodiments, the gauges may be arranged in a half-bridge configuration. The output of the strain gauges is proportional to the tension on the membrane. Therefore the output can be used in a feedback loop, described in FIG. 9B, to actively control the rotation of the roller 902.

In accordance with many embodiments, the support platform 904 may be designed such that the roller can rotate in such a manner so as not to interfere with the deployment or compaction of the deployable structure. Additionally, many embodiments may have attachment points to allow them to be attached to a release plate and a support plate (not shown). In many embodiments, the outer arm assembly 900 may be designed to rotate away from a central axis to further prevent interference with the deployable structure. Accordingly, one or more support platforms 904 may have hinge type attachments. The attachments may be same on both support platforms or may be different.

Turning now to FIG. 9B, embodiments of the control system are illustrated. FIG. 9 shows a schematic of an embodiment of a control system for the outer roller to maintain the proper tension on the membranes 908. In accordance with many embodiments the outer roller 902 may have a control motor 910 attached to one end of the roller 902. Although not shown, other embodiments may use multiple motors attached at both ends of the roller 902. The roller 902 may then be rotated about its central axis to control the movement and tension on the membrane 908. Each roller 902 must provide torque and allow the membrane to vary its length during the mechanism operations. The simplest way to achieve this is by installing a constant torque spring on it. However, an active device would provide more flexibility by actively controlling the force on the membrane. In many embodiments, the outer roller assembly 900 may have three controller components: a sensing element 912 that measures the force on the membrane (or the torque on the roller 902), an active element 910 that controls the rotation of the roller 902, and a microcontroller can provide a closed-loop control of the roller velocity to reach the desired force. A simple scheme of feedback control for the membrane stress-state can be illustrated by the embodiment in FIG. 9. There, the roller is mounted on an elastic support 914, whose deformation due to the membrane force is measured by sensing element 912. The deviation of the current value from the nominal one is then used as input to the motor 910 driving the roller 902.

Embodiments of Deployment and Compaction

Figure 10B:
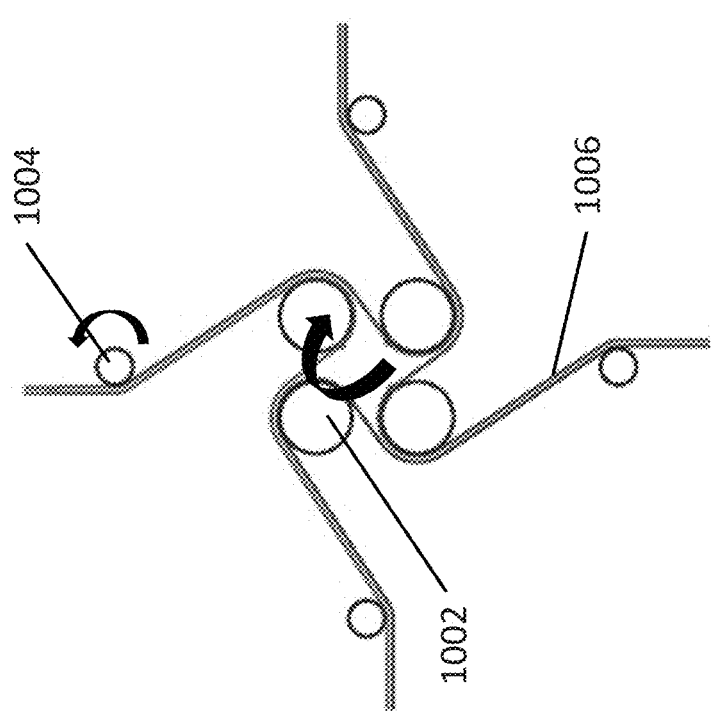
FIGS. 10A through 10D illustrate a process of compacting a deployable device in accordance with embodiments.
Figure 10A:
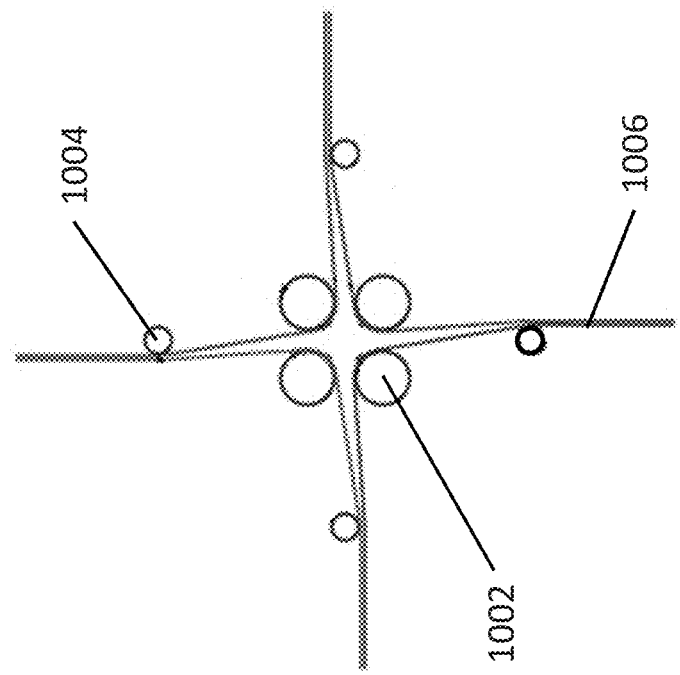
Figure 10D:
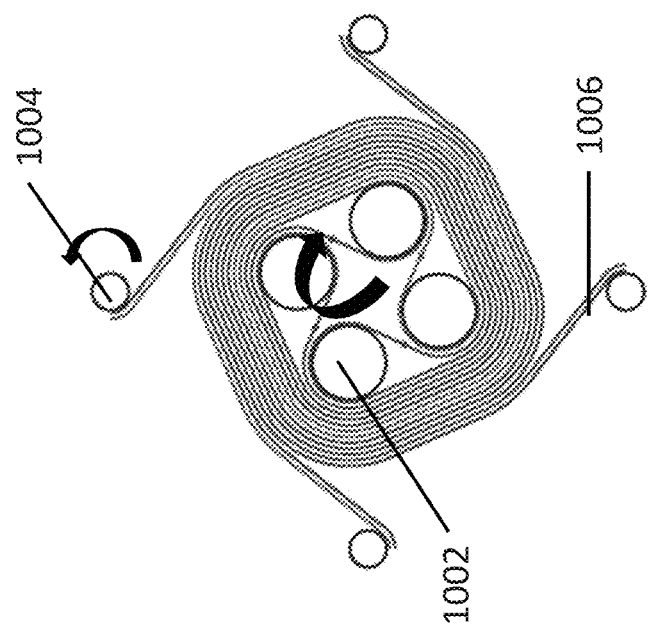
Figure 10C:
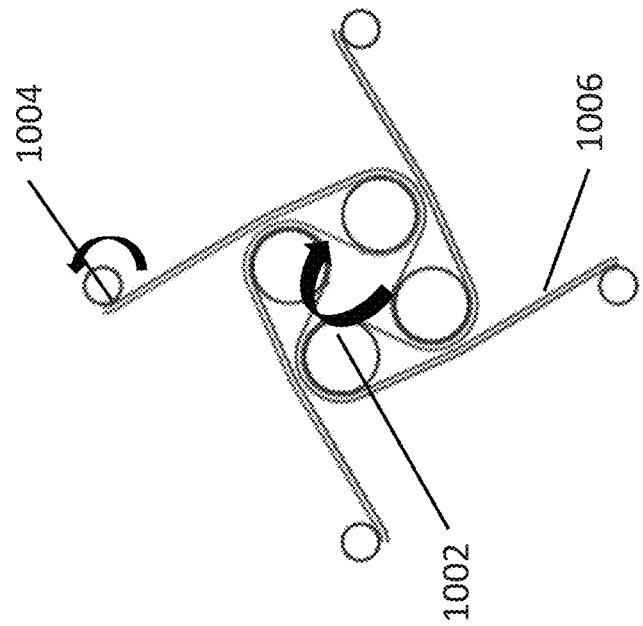

Turning now to FIGS. 10A through 19, systems and methods for controlling the deployment and/or compaction of the deployable structure are illustrated. FIGS. 10A through 10D illustrate embodiments of a deployment mechanism 1000 in a compaction process. For example, FIG. 10A illustrates an embodiment of a deployment mechanism 1000 where the inner tears 1002 and the outer rollers 1004 are fixed and not moving. Accordingly the membrane and deployable structure 1006 are held in place. FIG. 10B illustrates the rotational movement of the inner tears 1002 and outer rollers 1004 during a compaction process. As the inner tears rotate to compact the deployable structure 1006, the outer rollers rotate in a direction opposite that of the inner tears 1002. The counter rotation of the outer rollers can be controlled by a control motor and feedback system that helps to maintain the tension on the membrane and subsequently the pressure on the deployable structure. FIGS. 10C and 10D illustrate an embodiment of a deployment mechanism during a compaction process where FIG. 10C is more of a mid-compaction and FIG. 10D is closer to a final compaction state. Each figure indicates embodiments of various rotational elements of the rollers and central assembly, where they are designed to rotate in opposing directions.

Figure 11A:
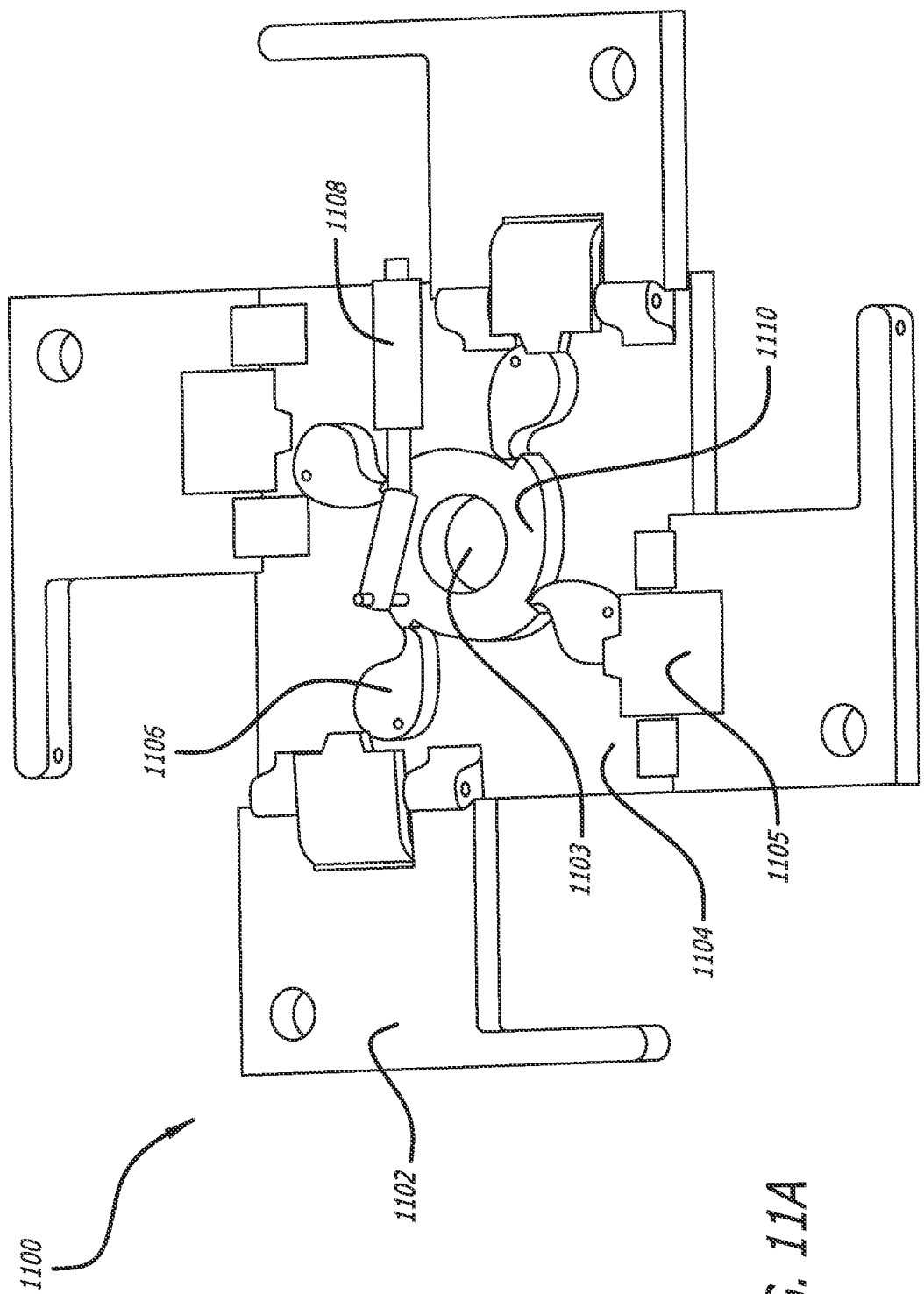
FIG. 11A through 11E illustrate release mechanisms in accordance with embodiments.

As previously discussed the internal tears and rollers can be held in place and supported during compaction by various elements including specially configured plates and upper holding and release mechanisms. The holding and release mechanism can be designed to hold the tears and rollers in place during compaction and deployment of the deployable structure. Additionally, many embodiments may utilize the holding and releasing mechanism to release the tension and pressure on the rollers and tears once the deployable structure is unwrapped from the deployment mechanism. FIG. 11A illustrates an embodiment of a holding and release mechanism 1100 that is designed to support the tears and rollers during compaction and deployment and then allow for a complete release of the rollers and tears to allow for a full deployment of the structure. In accordance with many embodiments, the release mechanism 1100 may be designed to allow for a simultaneous release of the platforms 1102. The simultaneous release of the platforms 1102 can help various embodiments by improving the controlled deployment of the deployable structure. Accordingly, the controlled deployment allows for more predictable and reliable actions. Many embodiments have multiple support platforms 1102 that are positioned around a central axis 1103. The support platforms 1102 may be attached to the main plate 1104 by a hinge 1105 element. The hinge element 1105 can be releasably controlled by a trigger 1106. In accordance with some embodiments, as the trigger 1106 rotates the hinge element 1105 can automatically release due to being spring loaded. Subsequently, the release of the hinge would allow the support platforms to move away from the main plate 1104. In many embodiments, the movement of the trigger 1106 can be managed by a drive system. The drive system in many embodiments, may include an actuator device 1108 connected to a gear 1110. In some embodiments the gear 1110 may be a ratchet gear. Although certain embodiments are illustrated in FIG. 11, it should be understood that any number of release elements may be used to allow for the release of the support platforms 1102 to allow for full deployment.

Figure 11C:
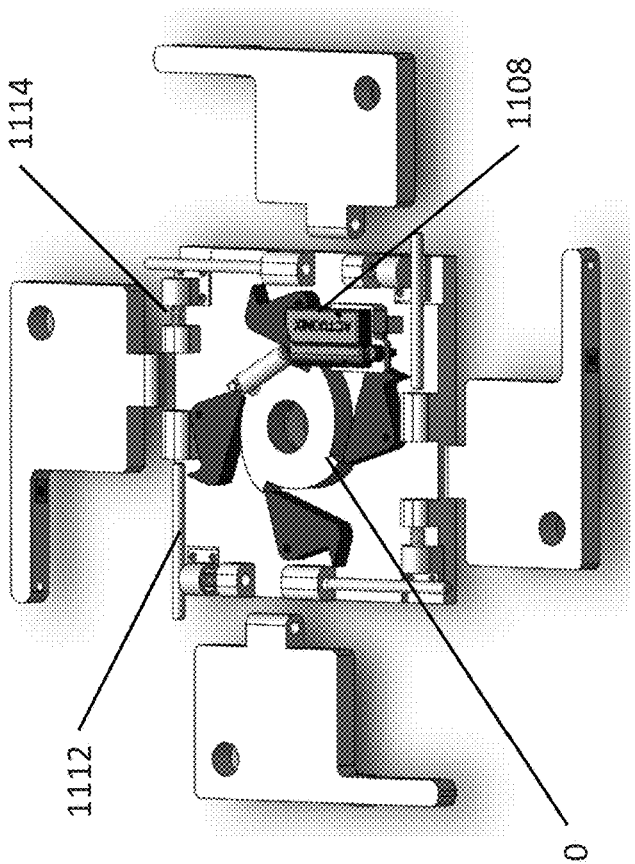
Figure 11B:
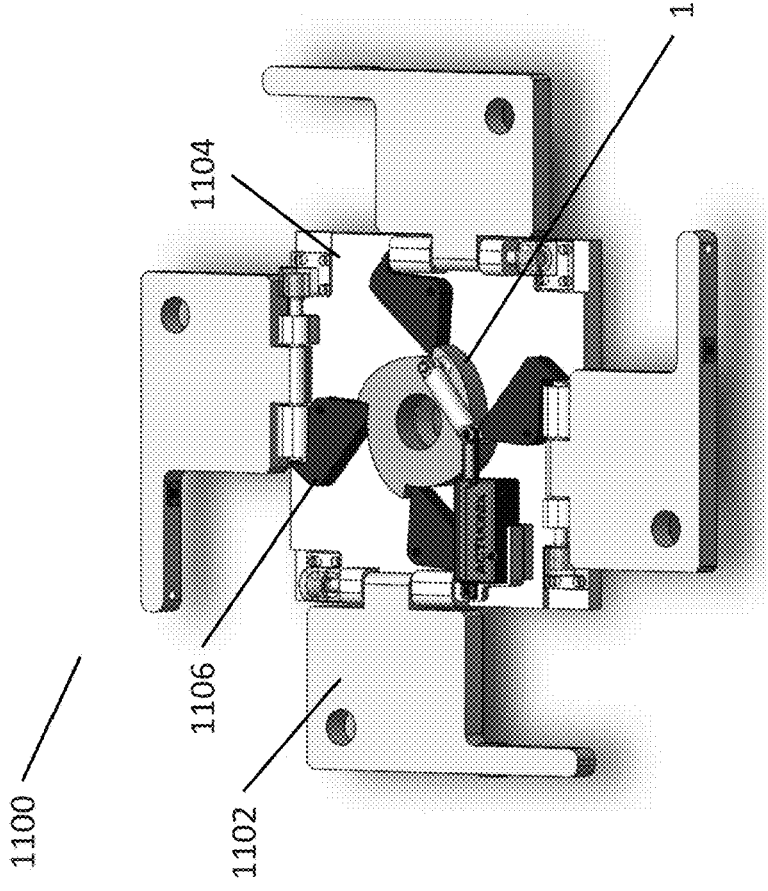
Figure 11E:
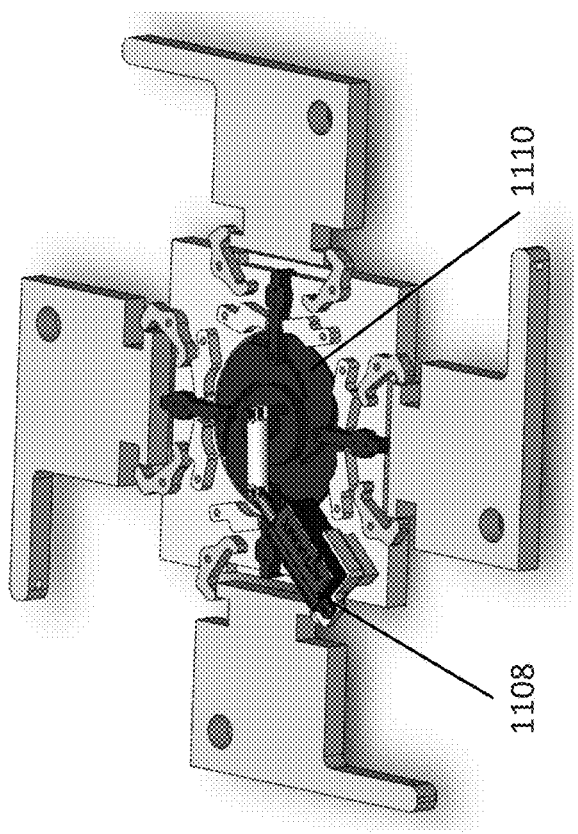
Figure 11D:
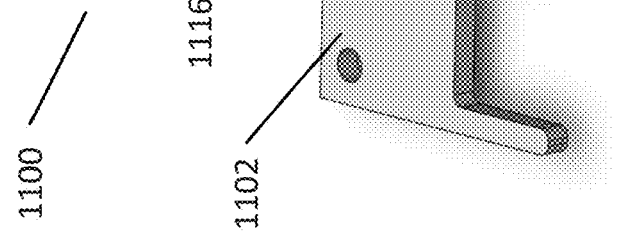

For example, FIGS. 11B through 11D illustrate other release mechanisms in accordance with embodiments. FIGS. 11B and 11C illustrate a release mechanism with a similar layout as the embodiment described in FIG. 11A. Accordingly, the mechanism 1100 has one or more platforms 1102 connected to a base plate 1104 and are configured to be released from the base plate 1104 in some manner. Similar to FIG. 11A, the release mechanism of FIGS. 11B and 11C may utilize a linear drive 1108 to rotate a gear mechanism 1110 that subsequently controls the movement of a centralized gear 1110. In some embodiments, the release of the platform 1102 can be accomplished by the removal or ejection of a dowel pin 1112. The dowel pin 1112 may be axially loaded by a compressed spring 1114 and held in place at one end by the trigger 1106. As the trigger 1106 is rotated out of the way by the movement of the gear 1110, the compressed spring 1114 can cause the dowel pin 1112 to be ejected from the support plate 1104. Subsequently the platforms 1102 can then move away from the mechanism.

In other embodiments, the support platforms 1102 can be removed or released from the support plate 1104 by way of a clamping device. For example FIGS. 11D and 11E illustrate a clamping style release mechanism in an engaged (11D) and a released (11E) state. FIGS. 11D and 11E illustrate the movement of the central gear 1110 from the actuator 1108. The movement of actuator 1108 and the gear 1110 accordingly moves two stops 1116 that subsequently move the two clamping elements 1118. In many embodiments, the movement of the clamps releases the platforms 1102 from the support plate 1104 and allow it to move away from the mechanism 1100. Although certain configurations of release mechanism are illustrated, it should be understood that any number of release mechanisms can be used to allow for the release of the support platforms of the outer roller arm assembly.

Figure 12:
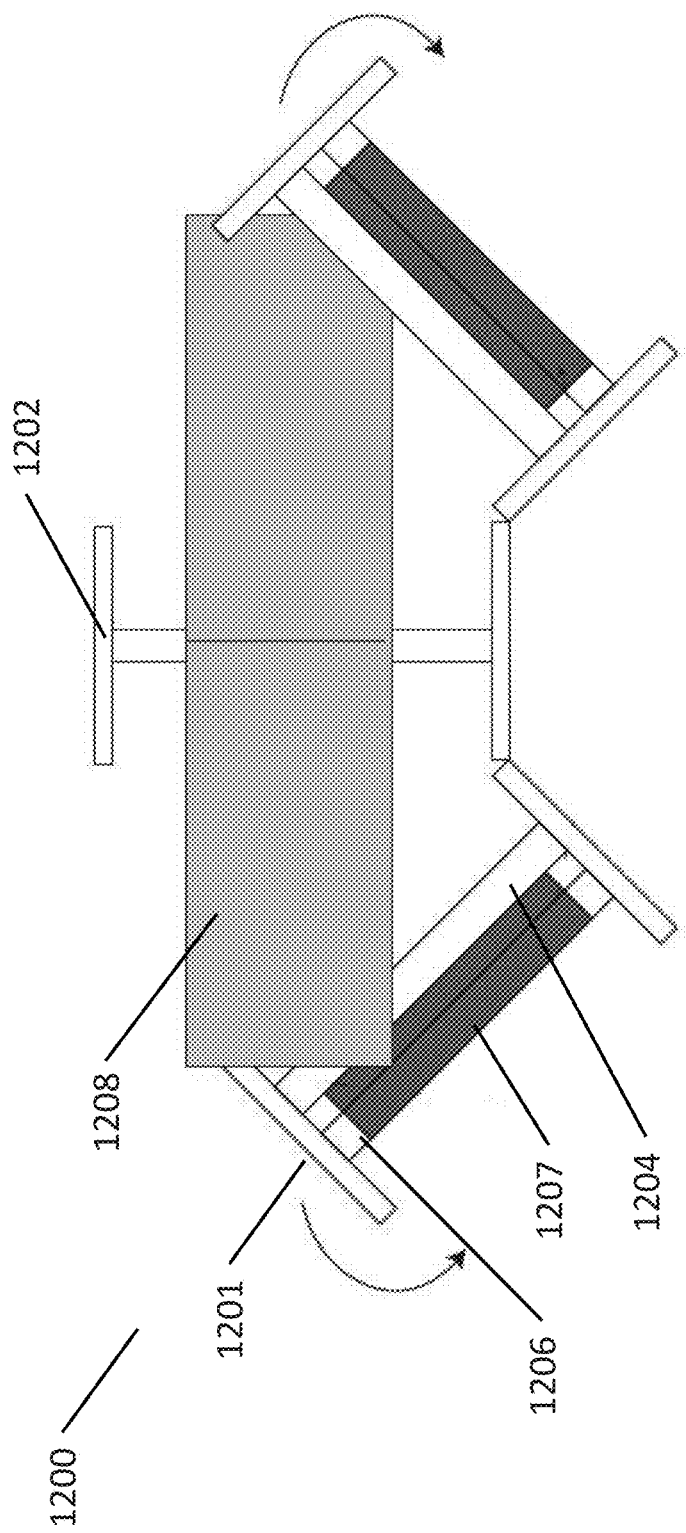
FIG. 12 illustrates a side view of the release of outer roller arm assemblies.

Turning now to FIG. 12, a side view of a release mechanism 1200 illustrating the release of the outer roller arm assembly 1201 from the deployment mechanism 1202. When the outer roller arm assembly 1201 is released from the deployment mechanism 1202 it can rotate away from the deployment mechanism and subsequently remove the tears 1204 and the rollers 1206 and membrane 1207 from the deployment mechanism. In accordance with many embodiments, the deployment structure 1210 will remain centrally located about the deployment mechanism once the roller arm assembly 1201 has been released. The release of the roller arm assembly subsequently releases any pressure from the deployable structure 1208 and will allow it to fully deploy in accordance with the deployment features of the structure 1208.

Figure 13C:
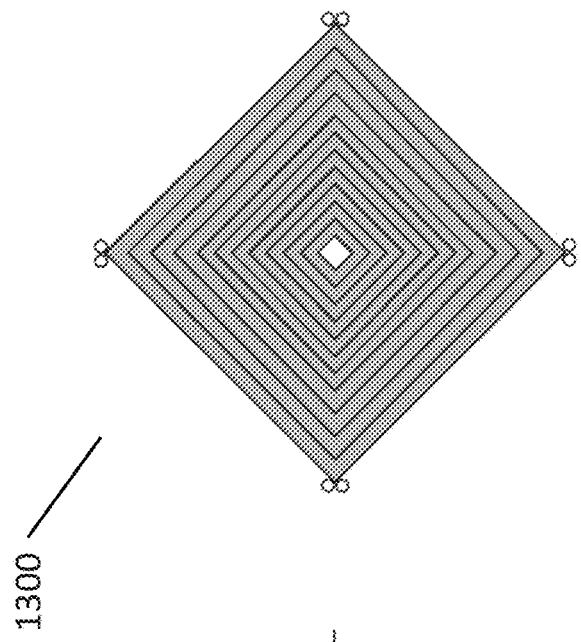
FIGS. 13A through 13C illustrate a method of full deployment of a deployable device in accordance with embodiments.
Figure 13B:
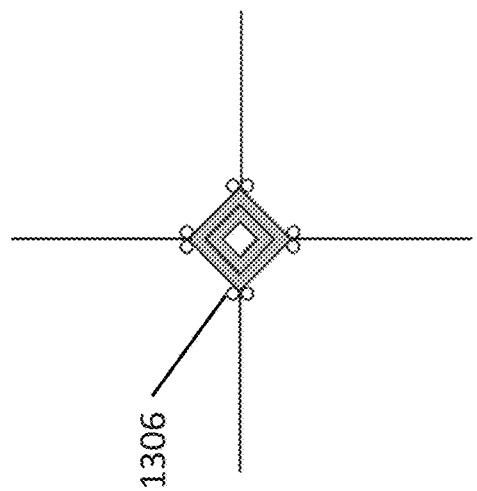
Figure 13A:
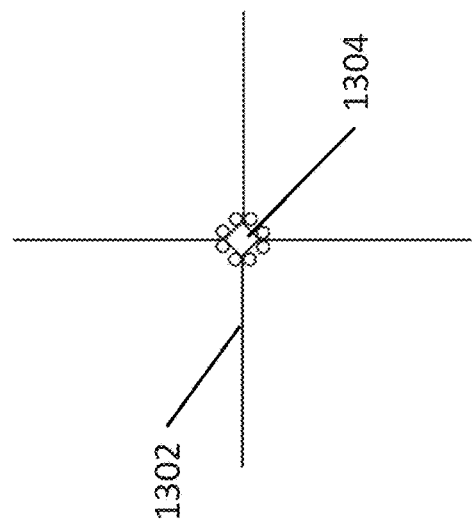

Turning now to methods of deployment and various embodiments of a deployable structure, FIGS. 13A-19C illustrate various embodiments of deployment, compaction and full deployment of a deployable structure. FIG. 13A through 13C illustrate steps of deployment of a deployable structure 1300 (best illustrated in FIG. 13C, fully deployed). FIG. 13A illustrates a deployable structure 1300 in a compacted form centrally located with booms 1302 extending outward from the deployment mechanism 1304. In some embodiments, the deployment of the deployable structure 1300 may utilize additional guide rollers 1306 that aid to guide the deployable structure 1300 along the booms 1032 to the point of full deployment of the structure 1300 as illustrated in FIG. 13C.

Figure 14:
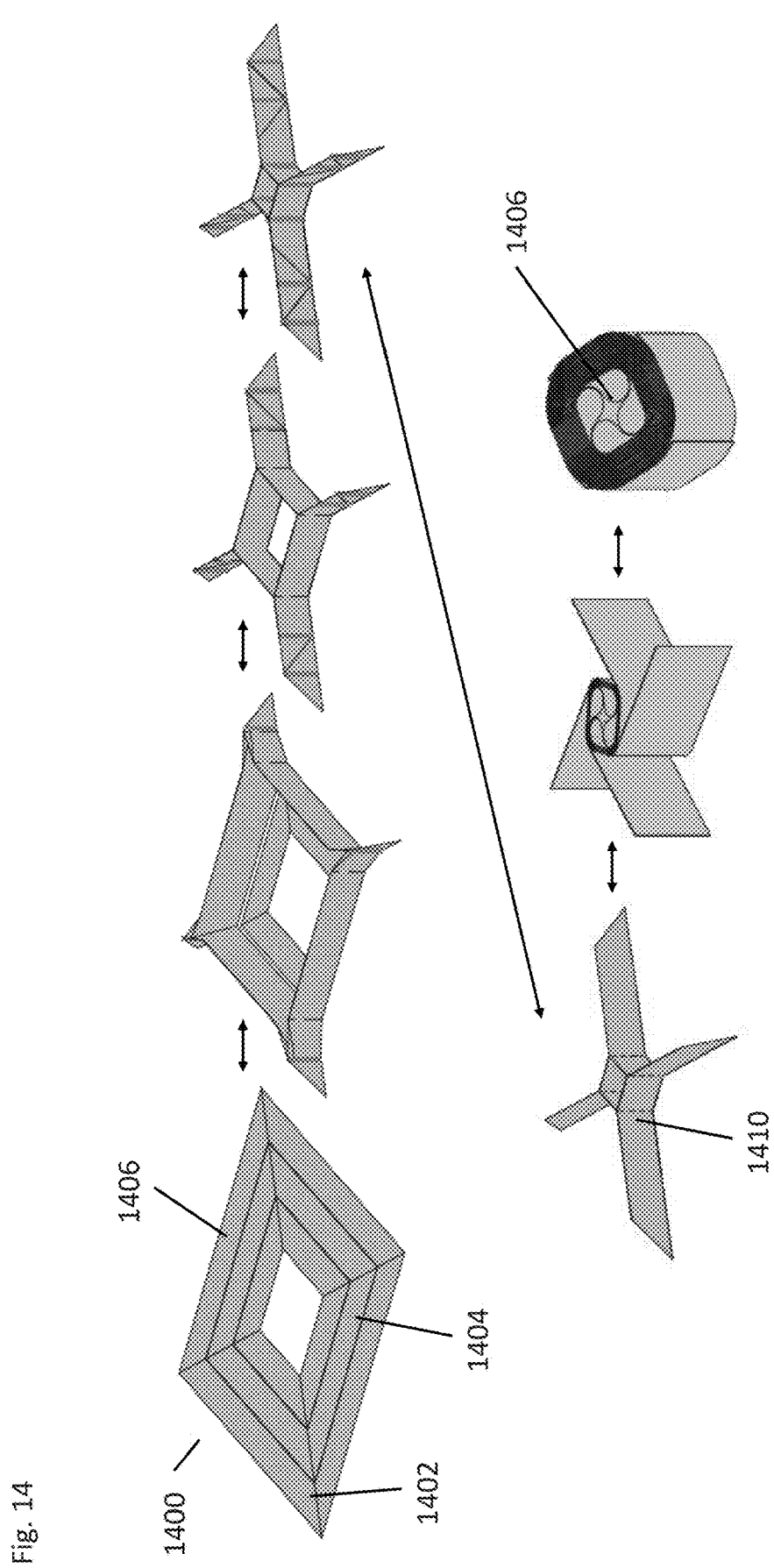
FIGS. 14 and 15 illustrates various stages of deployment in accordance with embodiments.
Figure 15:
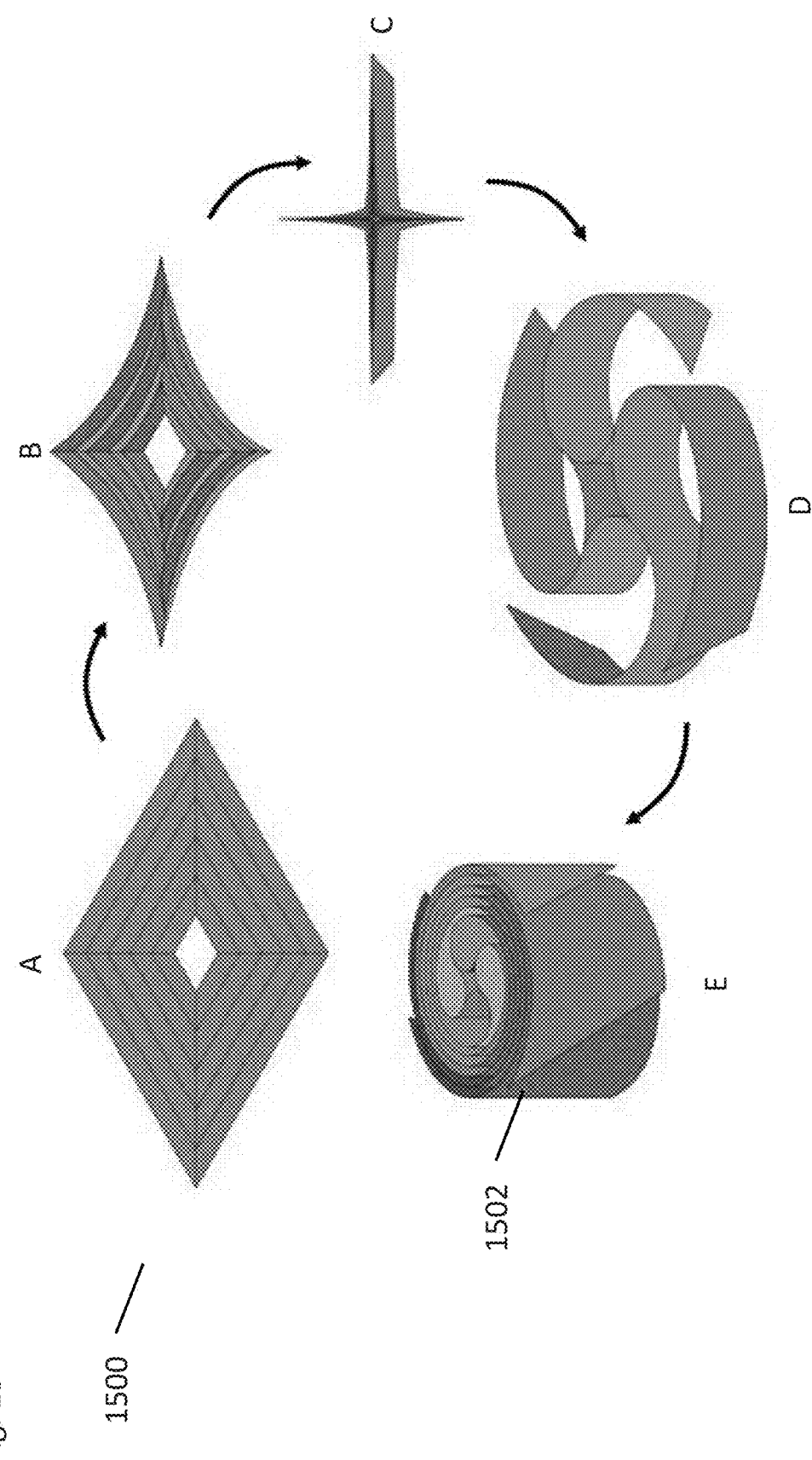

FIGS. 14 and 15 illustrate a process by which a deployable structure can be compacted and subsequently deployed in accordance with embodiments of a deployment mechanism. For example, FIG. 14 illustrates a foldable and compactable structure 1400 that has various fold axis (1402 and 1404). The fold axis (1402 and 1404) allow for the structure components 1406 to be folded and subsequently rolled or compacted by way of the deployment mechanism. In some embodiments the structure 1400 can be folded into a star shape 1410 having a particular height that is determined by the width of the structure components 1406. Accordingly, the height of the folded structure 1410 corresponds to the height of the tears and rollers of the deployment mechanism. Once in a star shape 1410, many embodiments can allow for the rolling or compacting of the star shape 1410 into a compacted structure 1406. FIG. 14 illustrates a compacted structure 1412 that corresponds to a circular cross section of a tear within the deployment mechanism. FIG. 15, like FIG. 14 illustrates a compaction and deployment method of a deployable structure. In contrast to FIG. 14, the embodiment illustrated in FIG. 15 result in a circular compacted structure 1502 that results from the teardrop cross section of a tear within the deployment mechanism.

Figure 16:
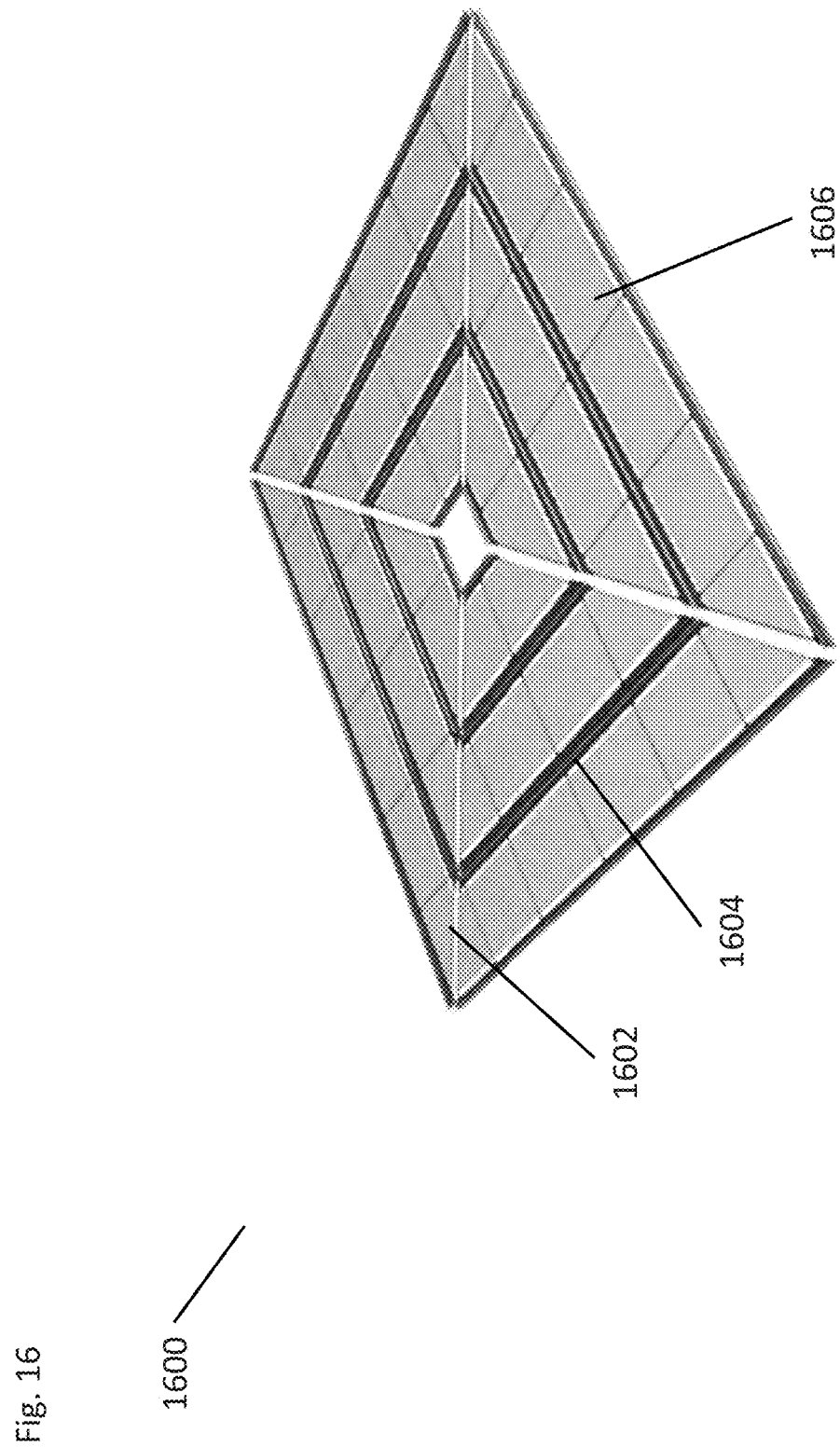
FIG. 16 illustrates a deployed structure in accordance with embodiments.
Figure 17:
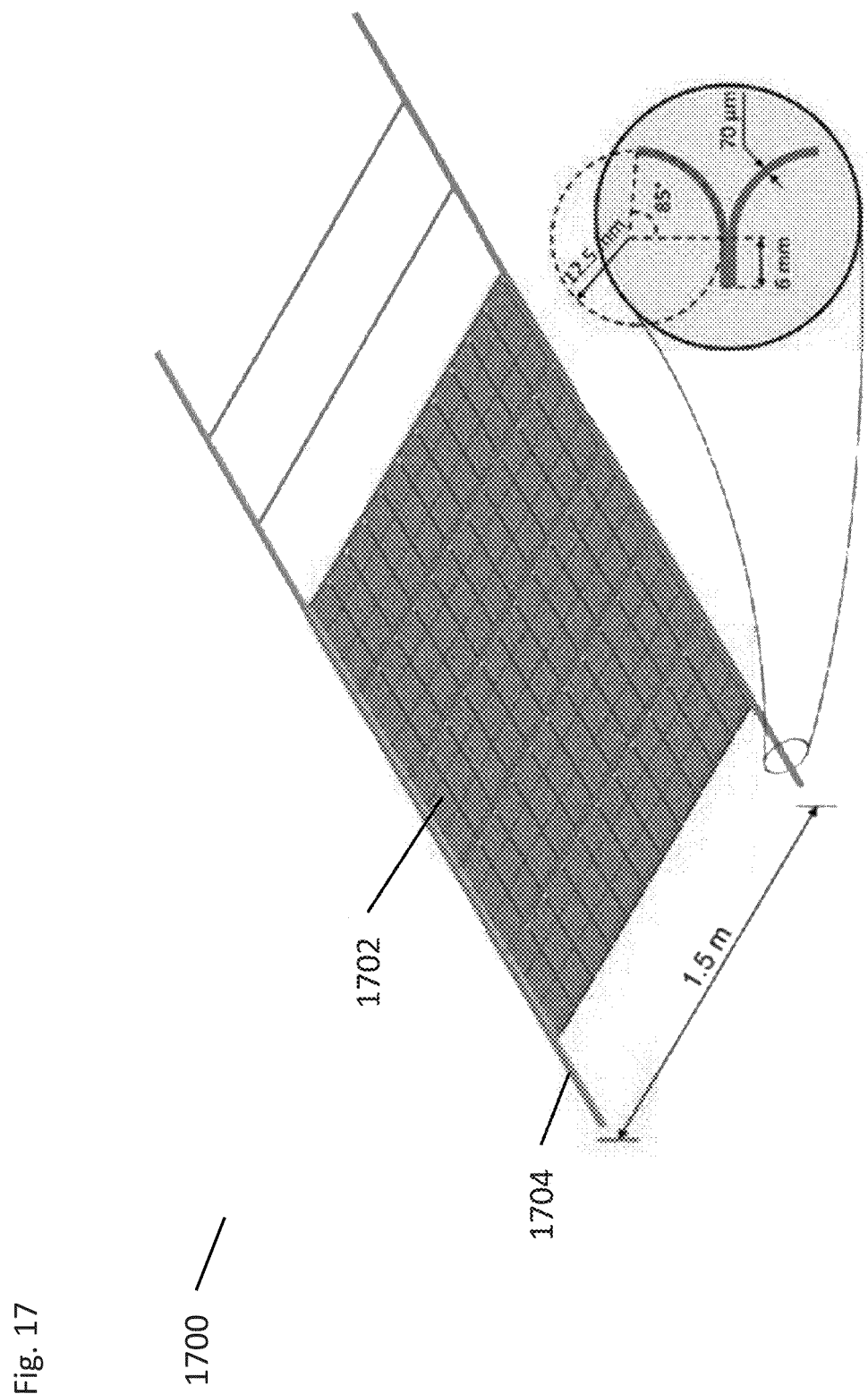
FIG. 17 illustrates a component of a deployable device in accordance with embodiments.

FIGS. 16 and 17 further illustrate an embodiment of a deployable structure that can be folded and rolled into the deployment mechanism. In FIG. 16 a deployable structure 1600 with various folding axis (1602 and 1604) is shown. The folding axis allow for a folding technique that can allow the deployable structure to be folded into a star shape similar to that illustrated in FIGS. 14 and 15. The deployable structure 1600 may be made up of various elements 1606 that perform the function of the deployable structure such as solar cells or other functions. For example, FIG. 17 illustrates an embodiment of a functional element 1702 that is positioned between two longerons 1704 or structural elements. The longerons, in some embodiments, may correspond or align with the folding axis illustrated in FIG. 16. The longerons 1704 may take on any form so long as they enable the compaction and subsequent deployment of the deployable structure. Likewise the functional elements 1702 may be configured to be compactable within a deployment mechanism.

Figure 18B:
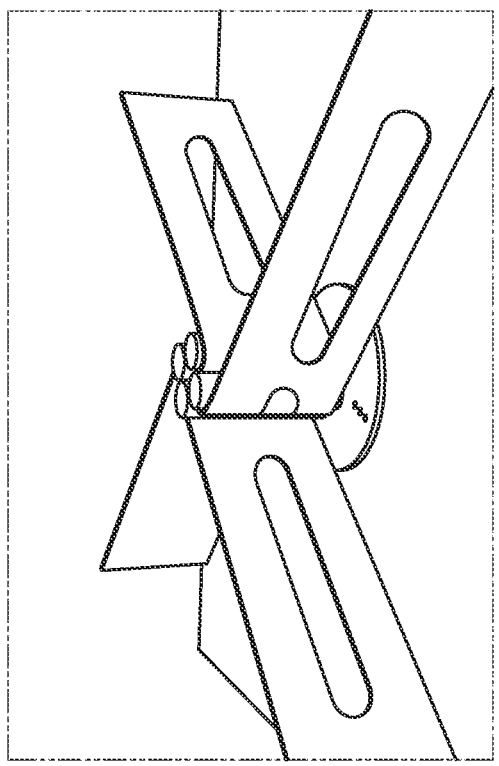
FIGS. 18A through 18C illustrate a deployment mechanism in various stages of deployment and/or compaction of a deployable structure in accordance with embodiments.
Figure 18C:
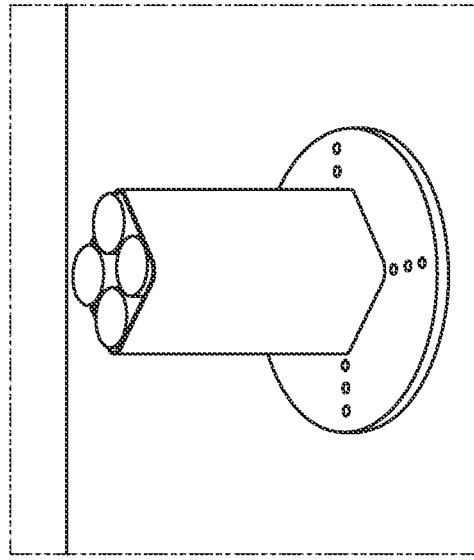
Figure 18A:
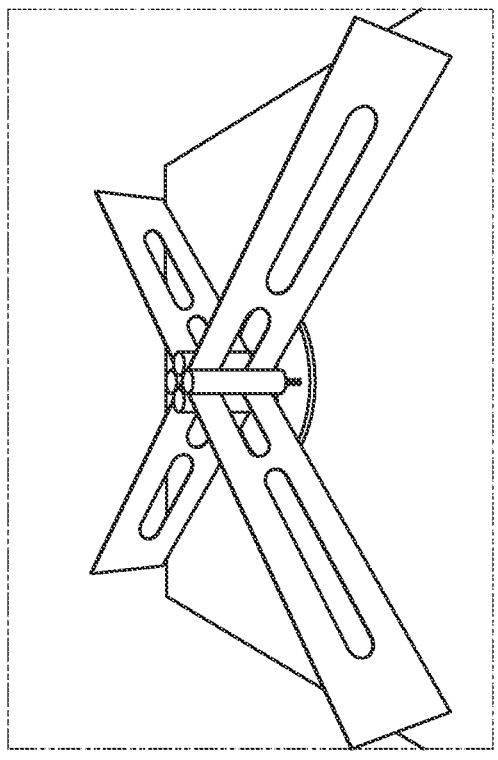
Figure 19:
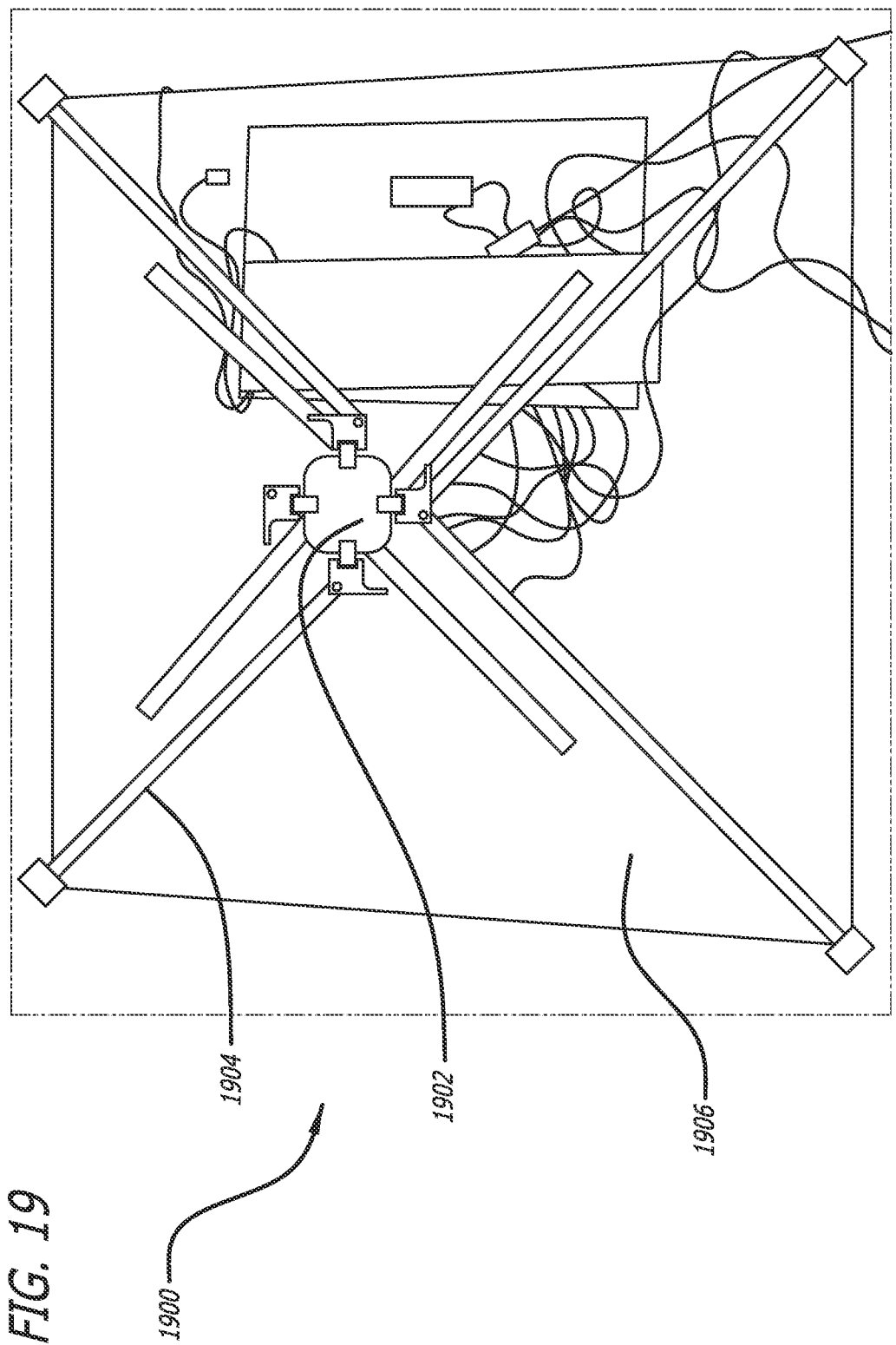
FIG. 19 illustrates a deployment mechanism in accordance with embodiments.

Turning now to FIGS. 18A through 19, embodiments of a deployment mechanism in the process of deployment and/or compaction. FIGS. 18A through 18C illustrate an embodiment of a deployment mechanism 1800 in use from the unwrapped state 18A to the compacted state 18C. Maintaining the structural integrity of a deployable structure, both during compaction/storage and deployment, can be difficult given the various environmental exposure it may see, including space. Structures that have been compacted can experience distortions that are undesirable in the final deployments. Accordingly, many embodiments are directed to systems and methods for actively controlling the deployment of the deployable structure in order to prevent distortions or damage to the structure.

FIG. 19, illustrates an embodiment of a deployment mechanism 1900 that includes, among other things, control motors (previously discussed) as well as guide booms 1902 that extend outwardly from the central component 1904 of the deployment mechanism 1900. Since many embodiments utilize control motors to actively control the release and compaction of the structure, the structure can be guided along the length of the booms by using guide lines 1906. In accordance with many embodiments, the guide lines 1906 can run from the central component 1904 to the outward end of the booms 1902. Additionally, the guide lines 1906 would not require to be placed under high tension since the deployment of the structure is actively controlled through pressure on the structure and not tension. This is in contrast to traditional guide lines and boom designs. Accordingly, the booms would not be required to counter act the high tension and thus would not be required to be made of high strength materials which are often heavy and bulky. As such, many embodiments may employ more lightweight materials into the design of the booms since the guide lines are merely guides and not high tension lines.

DOCTRINE OF EQUIVALENTS

As can be inferred from the above discussion, the above-mentioned concepts can be implemented in a variety of arrangements in accordance with embodiments of the invention. Specifically, many embodiments capitalize on a non-traditional approach to compacting deployable structures by using a tensioned membrane to apply pressure and actively controlling the deployment of the structure thus reducing the weight of the structure. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A deployment mechanism comprising;
   a central assembly wherein the central assembly further comprises:
      a plurality of compaction tears releasably disposed between a first rotational plate and a second rotational plate, wherein the central assembly is connected to a drive motor and configured to rotate about a central axis;
   a plurality of roller arm assemblies wherein each of the roller arm assemblies further comprises a tension controlled outer roller having an elongated body with a first end and a second end; and
   a plurality of membranes having a first end and a second end wherein the second end is connected to each of the compaction tears and the first end is connected to the tension controlled outer roller such that rotation of the central assembly applies a tension on each of the plurality of membranes.

2. The deployment mechanism of claim 1, further comprising:
   a motor housing supporting the drive motor; and
   a central shaft having a first end and a second end, wherein the first end is connected to the drive motor and the second end connected to the central assembly.

3. The deployment mechanism of claim 1, further comprising a torsional spring connected to the outer roller, wherein the tension control of the outer roller is controlled by the torsional spring.

4. The deployment mechanism of claim 1, further comprising a roller motor connected to the outer roller for controlling the tension of each of the outer rollers and configured such that each of the outer rollers rotates in a second direction opposite the first direction.

5. The deployment mechanism of claim 4, further comprising:
a tension control mechanism wherein the tension control mechanism comprises at least one strain gauge electronically connected to a motor control system; and
wherein the motor control system is connected to the roller motor such that the motor control system regulates the rotational speed of the roller motor in response to the tension sensed on the membrane by the strain gauge.

6. The deployment mechanism of claim 5, wherein the strain gauge measures deflection forces applied by tension on the membrane.

7. The deployment mechanism of claim 4, wherein the roller motor is disposed within the elongated body of the outer roller and further comprises a drive shaft with a first end and a second end supported by a bearing, wherein the bearing is connected to the body of the outer roller such that rotation of the drive shaft does not translate through the bearing to the body of the outer roller, and wherein the first end of the drive shaft is connected to the roller motor and the second end of the drive shaft is connected to a coupling element, and wherein the coupling element is connected to the body of the outer roller such that when the drive shaft rotates the body of the outer roller rotates.

8. The deployment mechanism of claim 1, wherein the compaction tears have a cross section selected from a group consisting of a circular cross section and a teardrop cross section.

9. The deployment mechanism of claim 1, wherein the first and second rotational plates each have a centrally located aperture aligned with the central axis and where the plurality of compaction tears are concentrically located about the aperture.

10. The deployment mechanism of claim 9, wherein the first and second rotational plates are configured to rotate the plurality of tears about the central axis in a first direction.

11. The deployment mechanism of claim 9, wherein the first and second rotational plates further comprise a plurality of control grooves disposed in a surface of the rotational plates and cooperatively engaged with a corresponding compaction tear such that the control groove prevents tangential movement of the compaction tear during rotation of the central assembly.

12. The deployment mechanism of claim 11, wherein the control grooves are configured to engage with a compaction tear with a cross section selected from a group consisting of a circular cross section and a teardrop cross section.

13. The deployment mechanism of claim 9, further comprising a plurality of compaction tear cages wherein the cages are disposed between the first and second rotational plates and wherein each of the plurality of roller cages corresponds to a compaction tear.

14. The deployment mechanism of claim 13, wherein the compaction tear cages have a cross section selected from a group consisting of circular cross section and a tear drop cross section.

15. The deployment mechanism of claim 1, wherein:
each of the plurality of roller arm assemblies further comprises a first support platform and a second support platform wherein the first end of the outer roller is connected to the first support platform and the second end of the outer roller is connected to the second support platform; and
the central assembly is further disposed between a first fixed plate and second fixed plate, wherein the first fixed plate further comprises a release mechanism interconnected with a proximal end of the first platform and the second fixed plate further comprises a pivot mechanism interconnected with a proximal end of the second platform.

16. The deployment mechanism of claim 15, wherein the deployment mechanism further comprises an element configured to release stored energy such that a force is imparted on the roller arm assembly such that at least a portion of the roller arm assembly moves distal from the central assembly.

17. The deployment mechanism of claim 15, wherein the pivot mechanism further comprises a hinge element wherein the hinge element is rotatably connected to the second support platform at a pivot point such that the roller arm assembly rotates about the pivot point radially away from the central assembly.

18. The deployment mechanism of claim 15, wherein the release mechanism comprises a plurality of clamp elements releasably engaged at a first end to the proximal end of the first support platform and engaged at a second end with a trigger configured to open thereby releasing the proximal end of the first support platform.

19. The deployment mechanism of claim 18, wherein the trigger is controlled by a rotational gear, and wherein the trigger rotates from a first position wherein the clamp securely engages the proximal end of the first support platform to a second position wherein the clamp opens to release the proximal end of the first support platform.

20. The deployment mechanism of claim 15, further comprising a plurality of support booms wherein each of the support booms further comprises a body with a first end and a second end, and a guide line connected from the first end to the second end and wherein the first end is connected to a fixed plate and the second end is positioned distal to the central assembly, and wherein each of the membranes is configured to move along the length of the body of one of the support booms.

21. The deployment mechanism of claim 20, wherein the boom is formed from a material selected from the group consisting of metal, metal alloys, and composite.

22. The deployment mechanism of claim 20, wherein the guide line is placed under tension.

\* \* \* \* \*